United States Patent
Mosher, Jr. et al.

(10) Patent No.: US 6,553,392 B1
(45) Date of Patent: Apr. 22, 2003

(54) SYSTEM AND METHOD FOR PURGING DATABASE UPDATE IMAGE FILES AFTER COMPLETION OF ASSOCIATED TRANSACTIONS

(75) Inventors: Malcolm Mosher, Jr., Los Gatos, CA (US); P. Simon Whitworth, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/418,425

(22) Filed: Oct. 14, 1999

Related U.S. Application Data

(60) Provisional application No. 60/118,770, filed on Feb. 4, 1999.

(51) Int. Cl.$^7$ ............................................... G06F 12/00
(52) U.S. Cl. ..................... 707/204; 707/10; 707/200; 707/206; 714/2; 714/15; 714/16; 714/20
(58) Field of Search ................... 707/1–10, 200–204, 707/206; 709/248; 714/2, 15, 16, 20; 382/100, 325

(56) References Cited

U.S. PATENT DOCUMENTS

| | | | |
|---|---|---|---|
| 5,590,274 A | * 12/1996 | Skarpelos et al. | 395/182.05 |
| 5,758,150 A | * 5/1998 | Bell et al. | 395/610 |
| 5,799,322 A | * 8/1998 | Mosher | 707/202 |
| 5,799,323 A | * 8/1998 | Mosher, Jr. et al. | 707/202 |
| 5,813,009 A | * 9/1998 | Johnson et al. | 707/100 |
| 6,041,420 A | * 3/2000 | Skarpelos et al. | 714/7 |

* cited by examiner

*Primary Examiner*—Kim Vu
*Assistant Examiner*—Joon Hwan Hwang
(74) *Attorney, Agent, or Firm*—Gary S. Williams; Pennie & Edmonds LLP

(57) ABSTRACT

A primary computer system has a database, application programs that modify the local database, and a transaction manager that stores audit records in a local image trail reflecting those application program modifications to the local database. In a remote backup system, a Receiver process receives audit records from the primary system. The audit records include audit update and audit backout records indicating database updates and database backouts generated by transactions executing on the primary system. The Receiver stores the audit update and audit backout records in one or more image trails. For each image trail there is an Updater process that applies to a backup database volume the database updates and backouts indicated by the audit update and audit backout records in the image trail. The remote backup system periodically executes a file purge procedure, which identifies the oldest transaction table from among the transaction tables in the last image trail file accessed for each of the image trails. Then, for each image trail, the file purge procedure accesses the image trial files in a predefined chronological order and for each accessed image trail file it compares a first set of newest transaction identifiers in the file's transaction table with a second set of oldest transaction identifiers in the identified oldest transaction table. The procedure purges the accessed image trail file only when all of the transaction identifiers in the first set are older than corresponding transaction identifiers in the second set.

15 Claims, 30 Drawing Sheets

Image Trail Status Array 392

| IT | Buffer Psn Information | MAT Psn of Last Rcv'd Record | Mellow Flag | Current LimitPosition |
|---|---|---|---|---|
| MIT | | | | |
| AIT 1 | | | | |
| AIT 2 | | | | |
| AIT 3 | | | | |
| AIT 4 | | | | |

FIG. 7E

Updater Table 400

| Updater | IT File | Status Info |
|---|---|---|
| U1 | AIT 1 | |
| U2 | AIT 2 | |
| U3 | AIT 3 | |
| U4 | AIT 4 | |

FIG. 7F

SYSTEM AND METHOD FOR PURGING DATABASE UPDATE IMAGE FILES AFTER COMPLETION OF ASSOCIATED TRANSACTIONS

This application is a continuation of, and claims priority on, U.S. provisional patent application serial No. 60/118,770, filed Feb. 4, 1999.

The present invention relates generally to database management systems having a primary database facility and a duplicate or backup database facility, and particularly to a system and method for synchronizing a backup database with a primary database while applications continue to actively modify the primary database.

BACKGROUND OF THE INVENTION

The present invention is an improvement on the Tandem "remote data facility" (RDF) technology disclosed in U.S. Pat. Nos. 5,799,322 and 5,799,323, both issued Aug., 25, 1998, which is hereby incorporated by reference as background information.

The prior art Tandem RDF technology underwent a number of changes over time to increase the bandwidth of the system, where the bandwidth is indicated by the peak number of transactions per second that can be performed on the primary system and replicated on the backup system. The present invention represents a set of new techniques so as achieve another large increase in bandwidth. Some of the techniques used by the present invention to increase bandwidth violate basic assumptions of the prior art systems, requiring both redesign of prior art mechanisms, and the some completely new mechanisms, to ensure that the backup system maintains "soft synchronization" with the primary during normal operation, and to also ensure that the backup system can be brought to an entirely consistent internal state whenever the backup system needs to perform at takeover operation and be used as the primary system.

SUMMARY OF THE INVENTION

In summary, the present invention is a distributed computer database system having a local computer system and a remote computer system. The local computer system has a local database stored on local memory media, application programs that modify the local database, and a transaction manager that stores audit records in a local image trail reflecting those application program modifications to the local database as well as commit/abort records indicating which of the transactions making those database modifications committed and which aborted. Each audit record has an associated audit trail position in the local image trail, otherwise referred to as a MAT (master audit trail) position.

The remote computer system, remotely located from the local computer system, has a backup database stored on remote memory media associated with the remote computer system.

A remote duplicate data facility (RDF) is partially located in the local computer system and partially in the remote computer for maintaining virtual synchronization of the backup database with the local database. The RDF includes an Extractor process executed on the local computer system, and a Receiver process and one or more Updater processes executed on the remote computer system.

The Extractor process, executed on the local computer system, extracts audit records from the local image trail. It has a plurality of message buffers (four in the preferred embodiment) for buffering groups of the extracted audit records together and transmits each message buffer to the remote computer system when the buffer is full or a timeout occurs.

The Receiver process, executed on the remote computer system, receives message buffers transmitted by the Extractor process and distributes the audit records in each received message buffer to one or more image trails in the remote computer system. The audit records include audit update and audit backout records indicating database updates and database backouts generated by transactions executing on the primary system.

The Receiver process stores the audit update records in one or more image trails, and stores each image trail in a sequence of image trail files. The Receiver process also stores in each image trail file a transaction table representing a range of transaction identifiers for transactions potentially pending in the primary system at the time that the first audit record in the image trail file was generated by the primary system.

For each image trail there is an Updater process that applies to a backup database volume the database updates and backouts indicated by the audit update and audit backout records in the image trail. The audit update and audit backout records are applied to the backup database volume in same order that they are stored in the image trail, without regard to whether corresponding transactions in the primary system committed or aborted.

The remote computer system periodically executes a file purge procedure, which identifies the oldest transaction table from among the transaction tables in the last image trail file accessed for each of the image trails. Then, for each image trail, the file purge procedure accesses the image trial file in a predefined chronological order and for each accessed image trail file it compares a first set of newest transaction identifiers in the file's transaction table with a second set of oldest transaction identifiers in the identified oldest transaction table. The procedure purges the accessed image trail file only when all of the transaction identifiers in the first set are older than corresponding transaction identifiers in the second set.

BRIEF DESCRIPTION OF THE DRAWINGS

Additional objects and features of the invention will be more readily apparent from the 25 following detailed description and appended claims when taken in conjunction with the drawings, in which:

FIGS. 7C, 7D, 7E, 7F, 7G and 7H are block diagrams of data structures used by the Receiver and Purger processes in a preferred embodiment of the present invention.

DESCRIPTION OF THE PREFERRED EMBODIMENTS

Overview of RDF System

Figure 1:
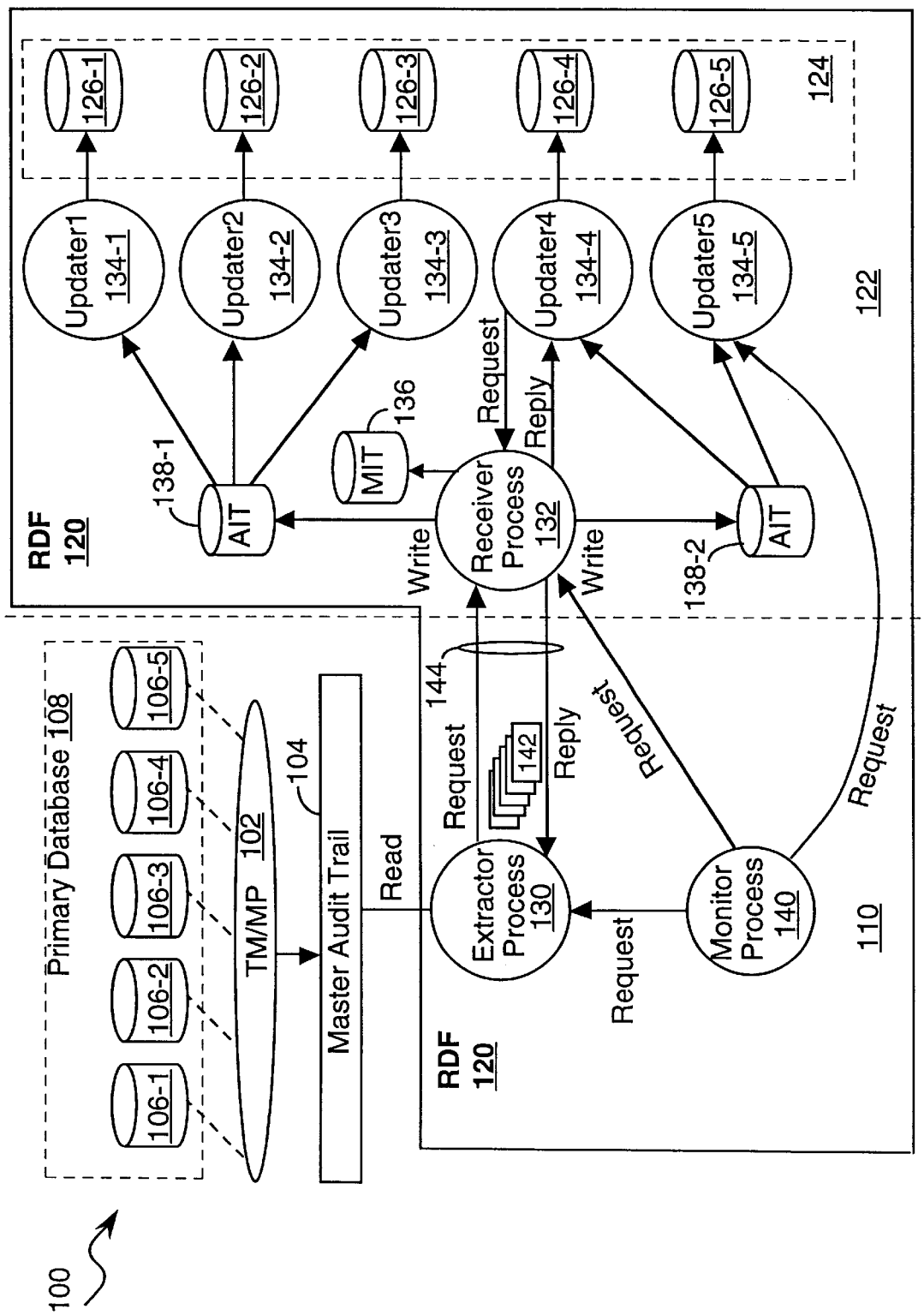
FIG. 1 is a block diagram of a prior art database management system with a remote duplicate database facility.
Figure 2:
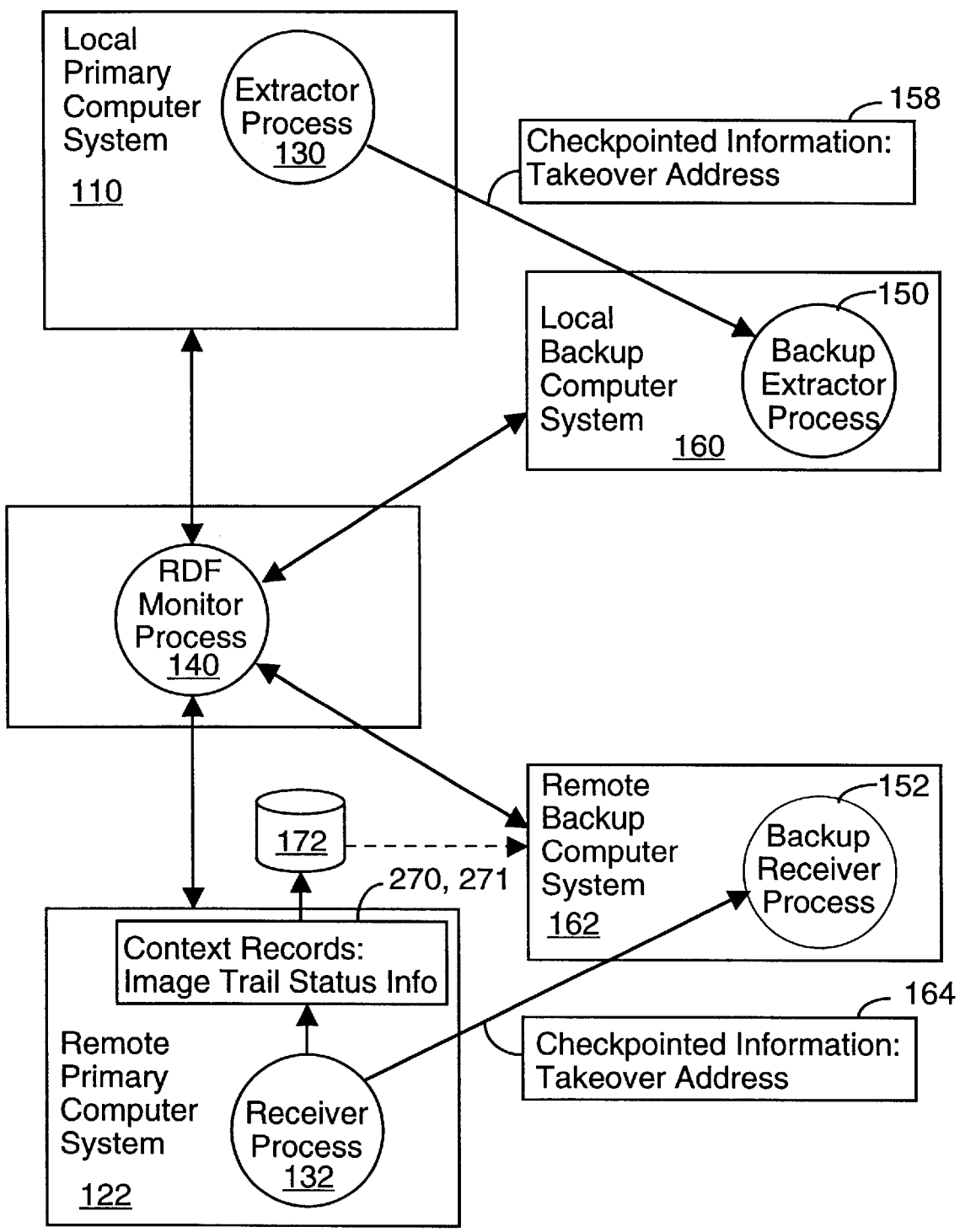
FIG. 2 is a conceptual representation of the checkpoint, context save, and failover procedures used by the system shown in FIG. 1.

FIG. 1 represents the basic architecture of Tandem Computer's RDF system, while FIG. 2 shows the relationship between some of the RDF processes and their respective local backup processes. In Tandem transaction processing systems each process has a respective local backup process that is automatically invoked if the primary process fails. Each local backup process is located on a different CPU than its respective primary process, and provides a first level of fault protection. A primary purpose of the RDF (remote data facility) system is to handle failures in the primary system that cannot be resolved through the use of local backup processes (and other local remedial measures), such as a complete failure of the primary system.

The computer system 100 shown in FIG. 1 has a transaction management facility 102 that writes audit entries to a master audit trail (MAT) 104. The audit entries indicate changes made to "audited files" on "RDF protected volumes" 106 of a primary database 108 on a primary system 110. All RDF protected volumes are configured to write all transaction audit records to the MAT 104.

The RDF system 120 includes processes on both the local processors 110, 160 and the remote backup processors 122, 162. The RDF 120 maintains a replicated database 124 (also called the backup database) by monitoring changes made to "audited files" on "RDF protected volumes" 106 on a primary system and applying those changes to corresponding backup volumes 126 on the backup computer system 122. An "audited file" (sometimes called an "RDF audited file") is a file for which RDF protection has been enabled, and an "RDF protected volume" is a logical or physical unit of disk storage for which RDF protection has been enabled.

On the primary computer system 110, an RDF Extractor process 130 reads the master audit trail (MAT) 104, which is a log maintained by the transaction management facility (TM/MP) of all database transactions that affect audited files, and sends all logical audit records associated with RDF-protected volumes to an RDF Receiver process 132 on the backup computer system.

The MAT 104 is stored as a series of files with sequentially numbered file names. The MAT files are all of a fixed size (configurable for each system), such as 64 Mbytes. The TMF 102 and Extractor 130 both are programmed to progress automatically (and independently) from one MAT file to the next.

The Extractor Process—Overview

Figure 5A:
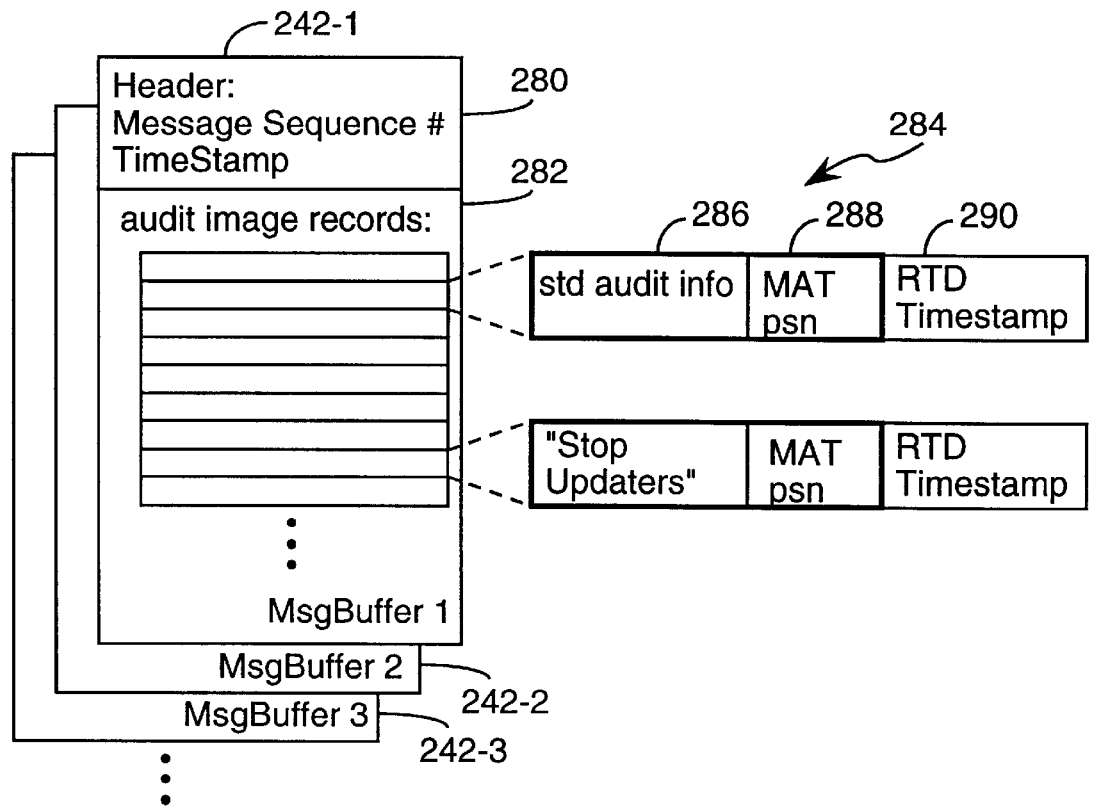
FIGS. 5A and 5B depict data structures used by the Extractor process in a preferred embodiment of the present invention.

Referring to FIG. 5A, the Extractor process 130 adds a MAT position value 288 and a timestamp 290 to each audit record that it extracts from the master audit trail 104 and that is associated with a protected volume. The MAT position value is the position in the MAT of the extracted audit record. The added timestamp is known as the RTD timestamp, and is the timestamp of the last transaction to complete prior to generation of the audit record in the MAT 104. The resulting record is called an audit image record, or image record 284. The Extractor process stores each audit image record in message buffers 242, each having a size of about 28 K bytes in the preferred embodiment.

The Extractor process uses two to eight message buffers 242, with four message buffers being a typical configuration. After filling and transmitting a message buffer 242 to the Receiver process via a communication channel 144 (FIG. 1), the Extractor process 130 does not wait for an acknowledgment reply message from the Receiver process 132. Rather, as long another message buffer is available, it continues processing audit records in the MAT 104, storing audit image records in the next available message buffer 242. Each message buffer 242 is made unavailable after it is transmitted to the Receiver process 132 until a corresponding acknowledgment reply message is received from the Receiver process 132, at which point the message buffer 142 becomes available for use by the Extractor process 130.

The Extractor process 130 performs a single checkpoint operation during startup of the Extractor process, and that checkpoint 158 only sends a takeover location to the backup Extractor process 150. (See FIG. 2.) It also does not durably store a context record. Rather, the Extractor process 130 relies on information received from the Receiver process 132 when RDF is either starting up or restarting, as will be explained in more detail below, as well as during an RDF startup.

Unlike prior art implementations, in the present invention the Extractor sends to the backup system all logical audit for the protected volumes, including update audit representing changes to database records made by transactions, and backout audit records (also called undo audit records) for aborted transactions. For updates and backouts, the Extractor stores both the before and after images of the updated database record in the image records sent to the backup system to enable these operations to be both redone and then reversed by the updaters 134.

The Extractor 130 also sends all transaction state records and TMP control point records to the backup system. There are five types of transaction state records: active, prepared, aborting, committed and aborted. TMP control point records indicate the boundaries of transaction computing intervals (called control point intervals) in the primary system. Every transaction is guaranteed to generate at least one transaction state record during each control point interval in which it is active (i.e., alive), except possibly the control point interval in which the transaction starts.

These transaction state and TMP control point records and their processing by the RDF system will be explained in more detail below.

The Receiver Process—Overview

The Receiver process 132 immediately acknowledges each received message buffer. No processing of the message buffer is performed before the acknowledgment is sent. The RDF system provides tight synchronization of the Extractor and Receiver processes and provides for automatic resynchronization whenever a start or restart condition occurs. For example the two processes will resynchronize whenever either process is restarted or has a primary process failure, and whenever the Receiver process receives audit records out of order from the Extractor process.

The Receiver process 132 sorts received audit records such that (A) transaction state records, including commit/abort records, and control point records are stored only in the master image trail 136, and (B) each database update and backout audit record is moved into only one image trail 138 corresponding to the only Updater process 134 that will use that audit record to update data stored on a backup volume 126.

While sorting and storing the received audit records, the Receiver process 132 determines the oldest and newest transactions active during each TMP control period for each processor of each node of the primary system, and stores this information in its context record. This "active transaction" information is also stored in the audit image trails used by the Updaters. The "active transaction" information is used to efficiently identify image trail files that can be purged because they are no longer needed by the system.

Whenever the Receiver process receives a special "Stop Updaters" audit record, it copies that record into all the image trails. The Stop Updaters audit record, produced on the primary system 110 by special "online DDL" procedures, causes each Updater 134 to stop. Each Updater logs a message indicating that it has shut down because it read a particular Stop Updaters record. When all the Updaters have shut down in response to the same Stop Updaters record, the operator of the RDF should (A) perform the same DDL procedure on the remote backup system as was performed by the online DDL procedure on the primary system, and then (B) to re-start the Updaters. This procedure is used to ensure continued virtual synchronization of the local and remote database when "online DDL" procedures are used to restructure database objects on the primary system with minimal interruption of user access to the database objects being restructured.

Figure 7A:
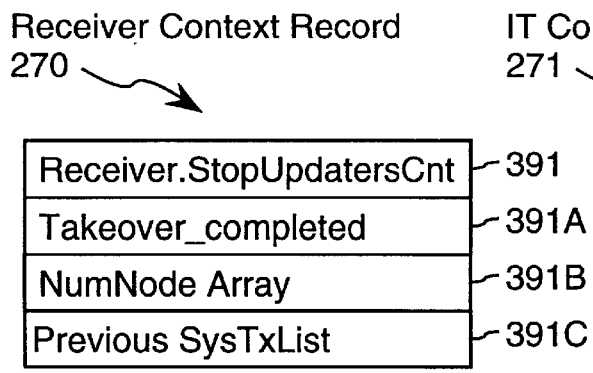
FIGS. 7A is a block diagram of a Receiver context record.
Figure 7B:
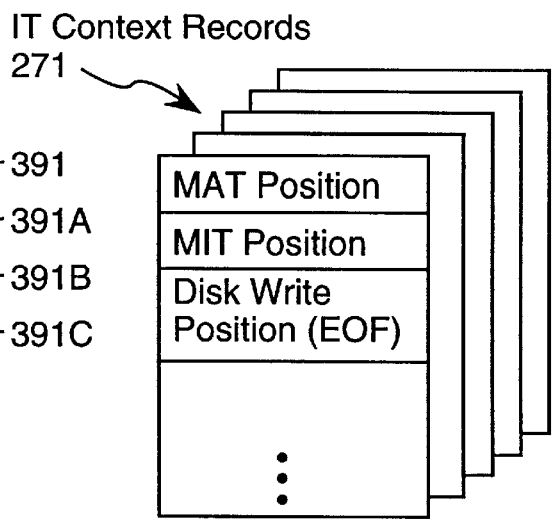
FIG. 7B is a block diagram of a set of image trail context records.
Figure 7C:
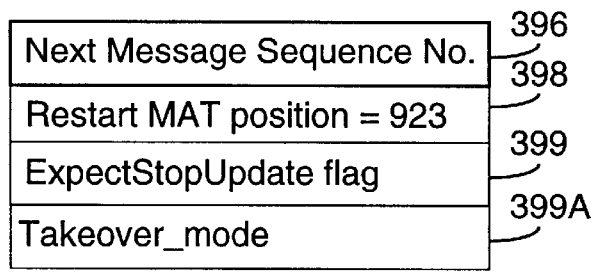

The Receiver process performs a single checkpoint operation during startup of the Receiver process, and that checkpoint 164 only sends a takeover location to the backup Receiver process 152. (See FIG. 2.) However, it does periodically (e.g., once every 5 to 15 seconds) durably store a Receiver context record 270 and a set of Image Trail context records 271 on a nonvolatile (disk) storage device 172 (see FIGS. 7A and 7B).

Purger Process—Overview

The Purger process periodically deletes image trail files that are not needed, even in the event of a takeover. Because the updaters apply audit to the backup database even for transactions whose outcome is unknown, the Purger only deletes image trail files all of whose audit records correspond to transactions whose outcome is known to the backup system.

Updater Processes—Overview

Each RDF-protected volume 106 on the primary computer system 110 has its own Updater process 134 on the backup computer system 122 that is responsible for applying audit image records to the corresponding backup volume 126 on the backup computer system 122 so as to replicate the audit protected files on that volume. Audit image records associated with both committed and aborted transactions on the primary system are applied to the database on the remote backup computer system 122. In the present invention, no attempt is made to avoid applying aborted transactions to the backup database, because it has been determined that it is much more efficient to apply both the update and backout audit for such transactions than to force the updaters to wait until the outcome of each transaction is known before applying the transaction's updates to the backup database. By simply applying all logical audit to the backup database, the updaters are able to keep the backup database substantially synchronized with the primary database. Also, this technique avoids disruptions of the RDF system caused by long running transactions. In previous versions of the Tandem RDF system, long running transactions would cause the backup system to completely stop applying audit records to the backup database until such transactions completed.

The audit image records in each image trail 136, 138 are typically read and processed by one to ten Updaters 134. Each Updater 134 reads all the audit image records in the corresponding image trail, but utilizes only the audit image records associated with the primary disk volume 106 for which that Updater is responsible.

At periodic intervals, each Updater durably stores its current image trail position to disk in a context record. This position is called the Restart image trail position.

When an Updater process 134 reaches a limit position specified by the Receiver, which is treated by the Updater as the logical end of file of the image trail 136,138 to which it is assigned, it performs a wait for a preselected amount of time, such as two to ten seconds before sending another message to the Receiver to request an updated limit position. Only when the limit position is updated can the Updater read more audit image records.

Monitor Process—Overview

Monitor process 140 and another process called RDF-COM (which will be collectively referred to as the Monitor for the purpose of this document) are is used to coordinate tasks performed in response to user commands to the RDF system.

RDF Configuration File

Figure 3:
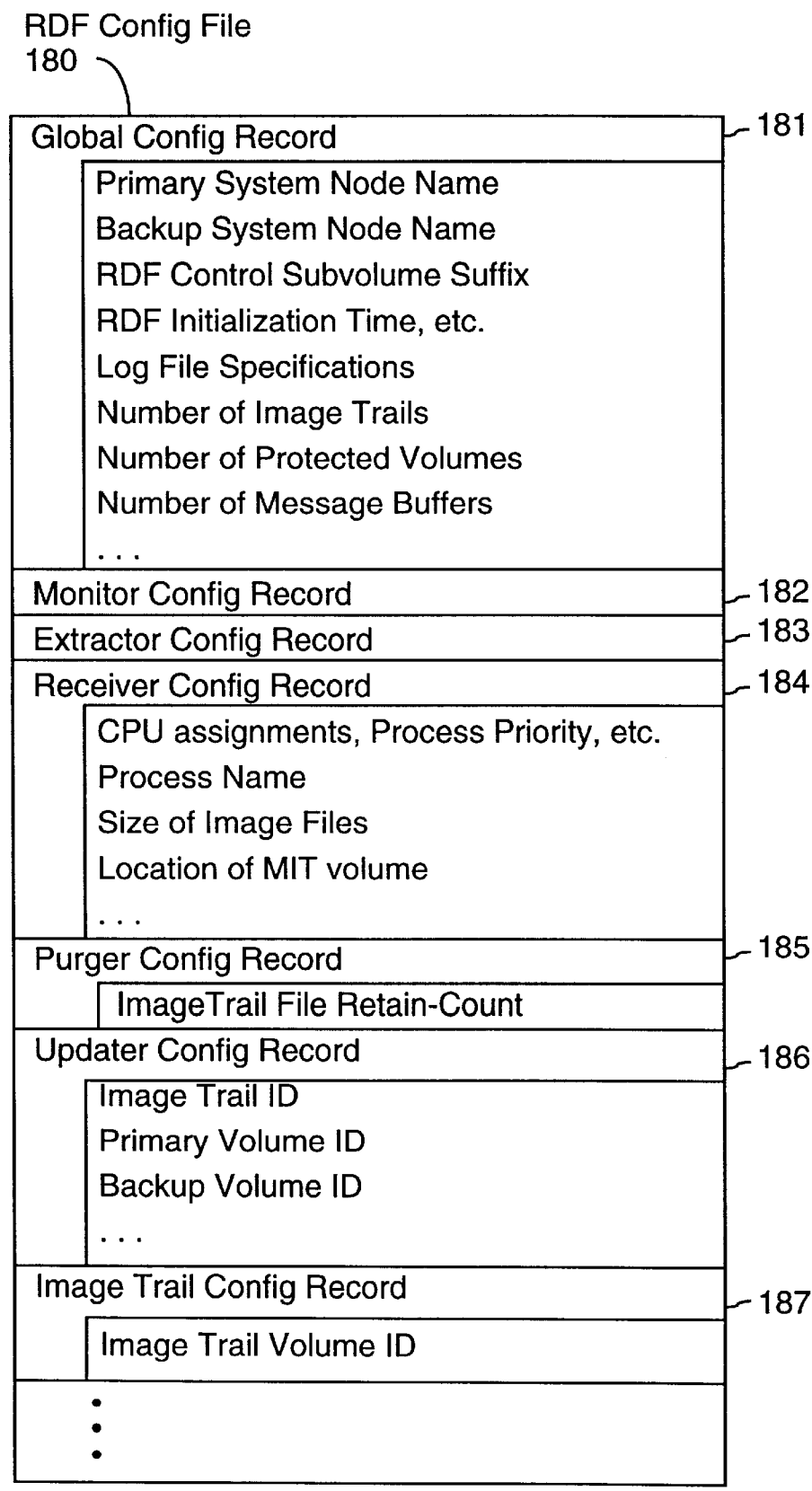
FIG. 3 is a schematic representation of the configuration file used to define the configuration of each RDF system in a preferred embodiment.

Referring to FIG. 3, the structure of each RDF system 120 is represented by a configuration file 180 that is stored on the control volume of the primary system 110 and the control volume of the backup system 122 associated with the RDF system. The RDF configuration file 180 includes

- a global RDF configuration record 181;
- a Monitor configuration record 182 for identifying characteristics of the RDF system's Monitor process;
- an Extractor configuration record for 183 for identifying characteristics of the RDF system's Extractor process;
- a Receiver configuration record 184 for identifying characteristics of the RDF system's Receiver process;

a Purger configuration record 185 for identifying characteristics of the RDF system's Purger process;

one Updater configuration record 186 for each of the RDF system's Updaters, for identifying characteristics of the corresponding Updater process; and one Image Trail configuration record 187 for each image trail in the backup system.

The information stored in the global RDF configuration record 181 includes:

the node name of the primary system;

the node name of the backup system;

the control subvolume used by the RDF system;

the time that the RDF system was initialized;

the name and location of the RDF system's log file;

the number of image trails in the backup system;

the number of protected volumes, which is also the number of Updaters in the backup system;

the number of message buffers used by the RDF system; and other information not relevant here.

Each of the process configuration records 182–187 includes information identifying the CPUs on which that process and its backup runs, the priority assigned the process, the name of the process, and so on. In addition, the Receiver configuration record 184 also specifies the size of each of the image trail files and the volume used to store the master image trail files.

The Purger configuration record 185 includes a parameter called the image trail RetainCount, which indicates the minimum number of image trail files to be retained for each image trail.

The Updater configuration records 186 each identify the image trail from which the associated Updater process is to read audit information, the primary volume whose audit information is to be processed by the Updater, and the backup volume to which database updates are to be applied by the Updater.

Each Image trail configuration record 187 identifies the disk volume on which the image trail files for the corresponding image trail are to be stored.

Using Parallel RDF Systems—Overview

Figure 4:
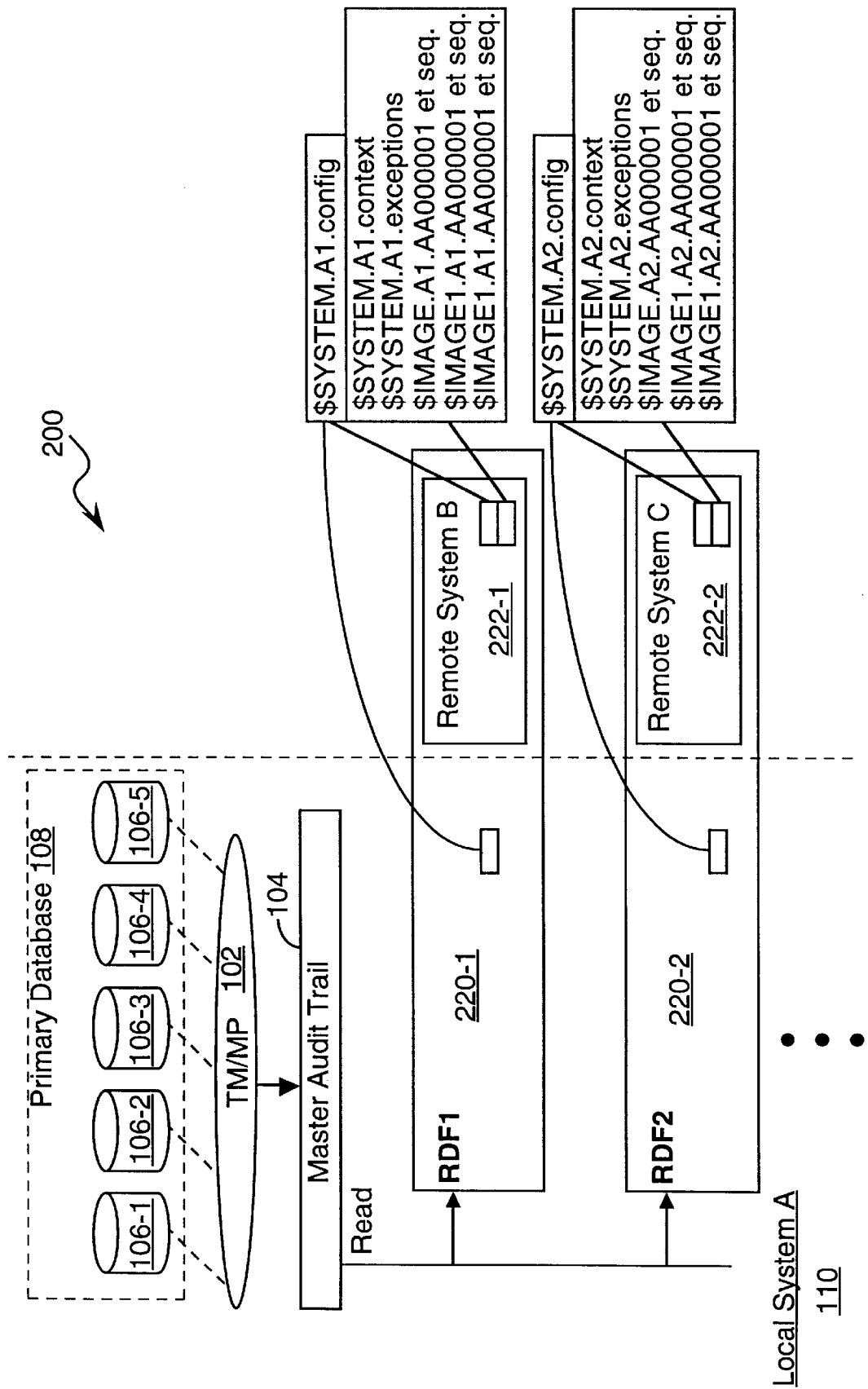
FIG. 4 is block diagram of a database management system having a plurality of parallel remote duplicate database facilities.

Referring to FIG. 4, there is shown a system in which data volumes 106 on a primary system 110 are protected by two or more parallel RDF systems 220. Each RDF system 220 contains its own copy of all the processes and data structures shown in FIG. 1 for a single RDF system 120.

Identical copies of the entire configuration file for each RDF system are stored on the primary and backup systems, while the context, exceptions and image files are only on the backup system.

Having multiple backup copies of a database is especially useful in at least two commercial settings:

1) Applications that perform intensive read only (browse mode) queries. A classic example of this would be a telephone billing system in which billing database updates are performed on the primary system and telephone directory inquiries are performed on the backup system.

2) Applications in which "triple contingency" protection is required. The relevant triple continency is the failure of the primary database system and one remotely located backup system (two contingencies) during overlapping time periods (the third contingency). In particular, in such applications, it is unacceptable to run applications on a single system without a backup system. Rather, it is required (A) that the primary system have at least two parallel backup systems, (B) after losing the primary system, one backup system is set up as the new primary system, (C) another backup system is set up as the backup to the new primary system, and (D) a new RDF system is established to replicate data from the new primary system onto that other backup system. Thus data on the primary system, even when it is actually a former backup system, is always protected by at least one RDF system. Examples of systems where triple contingency protection may be required are large banking systems, or a national monetary transaction or clearing house system.

Having a single RDF system configured to replicate databases across multiple backup systems is not practical for a number of reasons. For example, the Extractor process would be required to ship an audit buffer to multiple backup systems. But if the communication path to even one of the backup systems went down, either the Extractor system would have to cease shipping audit information to all the backup systems until the communication path problem were solved, or it would need to keep track of what audit information had been shipped to each of the backup systems (which would be inefficient). As a result, when multiple backup systems are needed, multiple RDF systems 220 with a common primary node are used.

In order to keep track of the locations of the files used by each of the parallel RDF systems 220, the following file naming convention is used in a preferred embodiment. The "pathname" of each RDF system's configuration file is preferably of the form "$SYSTEM.xxx.config" where $SYSTEM is the always the name of the control volume of any node in the system 100, "config" identifies the file as an RDF configuration file, and "xxx" is a "subvolume" name that uniquely identifies the RDF system 120. When a primary system 110 is protected by more than one RDF system, each of those RDF systems will have a different subvolume name. In the preferred embodiment, the subvolume name assigned to each RDF system is composed of the node name of the primary system and a one alphanumeric (e.g., 1, 2, . . . or any letter) character subvolume suffix. For instance, if the node name of the primary system 110 is "A", and two parallel RDF systems are used, their respective config files would likely be named $SYSTEM.A1.config and $SYSTEM.A2.config.

As shown in FIG. 4, similar file naming conventions are used for the context file, exceptions file and image files of each RDF system 220, as explained above. Each RDF system's context file stores all the context records for that system. Each time a context record is durably stored, that record is stored in the context file on disk. The exceptions files and image files are discussed in more detail below. In the preferred embodiment, image trails are stored on user selected volumes, which are different than the control volume $SYSTEM, but they still use the same "xxx" control subvolume name as the corresponding configuration and context files.

It should be noted that the RDF configuration, context and Exceptions files previously stored on a backup system's control subvolume (e.g., $SYSTEM.A1) must be deleted before a new RDF configuration using the same backup system can be initialized. The RDF system will automatically purge any old image trail files when a new RDF system is first started.

Audit Record Types

The master audit trail (MAT) 104 contains the following types of records:

Update records, which reflect changes to a database volume made by a transaction by providing before and after record images of the updated database record. Each update record indicates the transaction ID of the transaction that made the database change and the identity of the database volume and database record that has been updated.

Backout records, which reflect the reversal of previous changes made to a database volume. The database changes represented by backout records are sometimes herein called update backouts and are indicated by before and after record images of the updated database record. Backout audit records are created when a transaction is aborted and the database changes made by the transaction need to be reversed. Each backout record indicates the transaction ID of the transaction that made the database change and the identity of the database volume and database record that has been modified by the update backout.

Transaction state records, including commit and abort records, transaction active records, as well as transaction prepared and transaction aborting records. Commit and abort records indicate that a specified transaction has committed or aborted. Transaction active records (also sometimes called transaction alive records) as well as transaction prepared and transaction aborting records indicate that a transaction is active. Each transaction state record indicates the transaction ID of the transaction whose state is being reported. Every active transaction is guaranteed to produce one transaction state record during each TMP control time frame (i.e., between successive TMP control points). A transaction active record is stored in the master audit trail if the transaction does not commit or abort during a TMP control time frame.

TMP control point records, which are "timing markers" inserted by the TMF 102 into the master audit trail at varying intervals depending on the system's transaction load. During heavy transaction loads, TMP control point records may be inserted less than a minute apart; at moderate transaction loads the average time between TMP control point records is about 5 minutes; and under very light loads the time between TMP control point records may be as long as a half hour. The set of audit records between two successive TMP control point records are said to fall within a "TMP control time frame".

Stop Updaters records, which cause all Updaters to stop when they read this record in their image trails.

Other records not relevant to the present discussion.

Detailed Explanation of Extractor Process

Figure 5B:
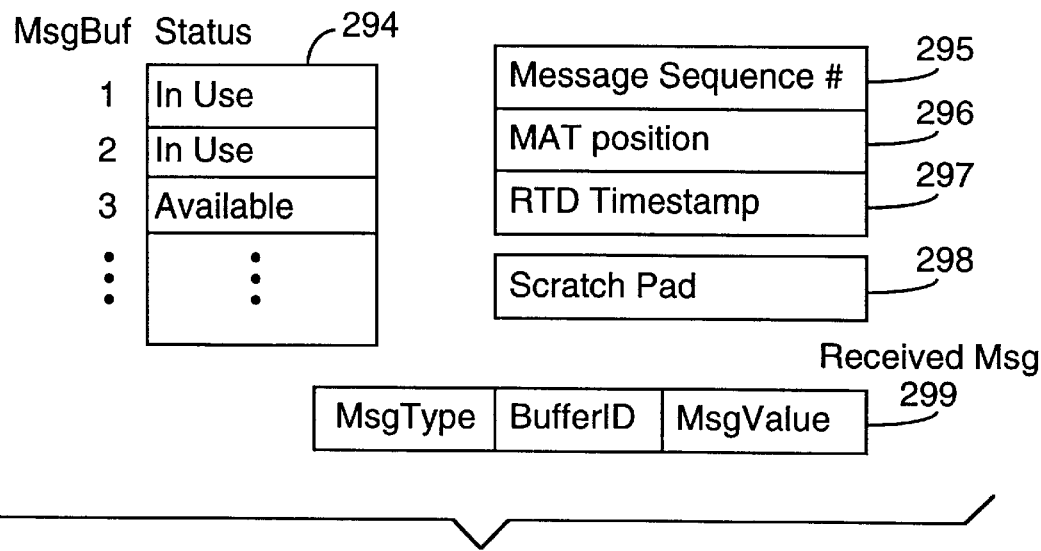

Referring to FIGS. 5A and 5B, the primary data structures used by the Extractor process 130 are as follows. As stated earlier, the Extractor process 130 utilizes two or more message buffers 242. A portion of each message buffer 242 is used to store a "header" 280, which includes (A) a message sequence number and (B) a timestamp. The body 282 of the message buffer 242 is used to store audit image records 284. Each audit image record 284 includes an audit information portion 286, a MAT position value 288 and a RTD (relative time delay) timestamp value 290. The audit information portion 286 is copied from the audit record in the MAT 104, while the MAT position 288 of the audit record and RTD timestamp field 290 are added by the Extractor process to create an "audit image record" 284.

The audit information portion 286 consists of the standard information found in audit records in the MAT 104, such as before and after field values for a modified row in a database table, or a commit/abort indication for a completed transaction. Other audit records in the MAT that are relevant to this document are the other types of transaction state records mentioned above, TMP control point records, and "Stop Updaters" audit records.

The Extractor process 130 also maintains a message buffer status table 294, which indicates for each message buffer whether that buffer is available for use, or not available because it is currently in use by the Extractor. In addition, the Extractor process 130 maintains a message sequence number in register 295, a MAT file pointer in register 296, a local timestamp value in register 297, and a scratch pad 298 in which it stores audit image records that it is currently processing.

Finally, the Extractor process 130 includes a data structure 299 for storing reply messages received from the Receiver process 132. This data structure includes a first field indicating the type of message received, which is equal to either "message buffer acknowledgment" or "resynch reply", a message buffer identifier, and a "message value" field. The message value field is equal to a MAT position value when the message type is "resynch reply," and is equal to either an "OK" or "Error" condition code when the message type is "message buffer acknowledgment."

Referring to FIGS. 6A–6E, the Extractor process 130 works as follows.

The Extractor Startup Procedure 300 is called whenever the Extractor process 130 or its backup starts up, as in the case of a failover or a transfer of control back to the primary Extractor process 130 from the backup Extractor process. The Startup procedure begins by performing a "static initialization" of the Extractor process (302), which means that all static data structures used by the Extractor process are allocated and initialized. While initializing static data structures, the Extractor process reads information denoting the set of RDF protected objects from the configuration file, and builds an internal table of RDF protected disk volumes. This table is used later as an audit record filter, such that audit records for non-RDF protected volumes are ignored by the Extractor process. The startup procedure then creates a backup process (304). Then a checkpoint operation is performed in which a takeover location is transmitted to the backup Extractor process (306). The takeover location is, in essence a program address, and in the preferred embodiment the takeover location is the program location at which execution of the volatile initialization procedure 310 begins. Finally, the Extractor Startup procedure calls (308) the Extractor Volatile Initialization procedure 310.

The Extractor Volatile Initialization procedure 310 is called during startup by the Extractor Startup procedure 300, when the Extractor receives an Error reply message from the Receiver, and whenever there is an Extractor process failure. The Extractor Volatile Initialization procedure begins by allocating and initializing all volatile data structures used by the Extractor process, including message buffers 142, the message buffer status array 295 (312), and the message sequence number (which gets initialized to an initial value such as 1). Then the Extractor Volatile Initialization procedure transmits a Resynchronization Request message to the Receiver process (314) and waits for a Resynch Reply message (316). The Resynch Reply message will contain a MAT position value, which the Extractor Volatile Initialization procedure moves (318) into the MAT position MATpsn 296. Finally, the Extractor Volatile Initialization procedure calls (320) the main Extractor procedure 330.

The Main Extractor procedure 330 begins by initializing and starting a timer called the Message Timer (MsgTimer) (332). The Message Timer is typically programmed to expire in one second, although the timeout period is configurable to virtually any value. Next, the Extractor procedure reads a record in the MAT (334). If the MAT record is a logical audit (i.e., update or backout) record for an RDF protected volume, a transaction state record for any transaction, TMP control point record, or a "Stop Updaters" record, an audit image record is made by copying the MAT record and adding to it the MAT position of the current MAT record to the audit image record and by adding an RTD timestamp to the audit image record (336). The added RTD timestamp is the timestamp of the last transaction to complete prior to generation of the audit image record. Every time the Extractor procedure encounters a commit or abort audit record, it moves a copy of the timestamp in that record into its local timestamp register 297. The value in the local timestamp register 297 is the RTD (relative time delay) timestamp that is added to audit records so as to generate an audit image record, also known as an image record.

If the message buffer currently in use has room for the resulting audit image record (338) it is moved into the message buffer (340). Then the Extractor procedure continues processing the next record in the MAT at step 334.

If the message buffer currently in use is full (338), the values stored in the message sequence number register 295 and the timestamp register 297 are inserted into the Message Buffer's header 280 (342). The Extractor procedure then transmits the message buffer to the Receiver process (344). After transmitting the message buffer, the Message Buffer Status array 294 is updated to indicate that the message buffer just transmitted is not available for use. In addition, the Message Timer is cleared and restarted, and the Message Sequence Number in register 295 is increased by one (346). Finally, the audit image record that did not fit in the last message buffer is moved into the next available message buffer (348). If a next message buffer is not available, the Extractor procedure waits until one becomes available and then moves the audit image record into it. Then the Extractor procedure continues processing the next record in the MAT at step 334.

When the audit record read (334) from the MAT 104 is not an audit record for an RDF protected volume, is not a transaction state record, is not a "Stop Updaters" record and is not TMP control point record, the audit record is ignored and the next audit record (if any) in the MAT is read (334).

Figure 6A:
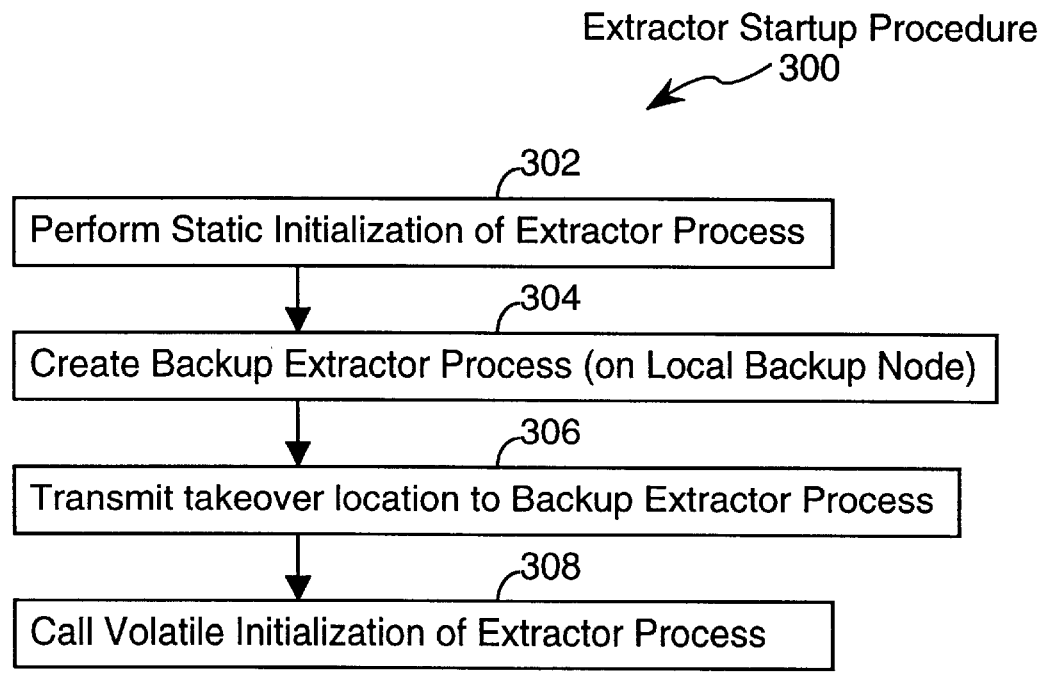
FIGS. 6A, 6B, 6C, 6D and 6E are flowcharts of procedures executed by the Extractor process in a preferred embodiment of the present invention.
Figure 6B:
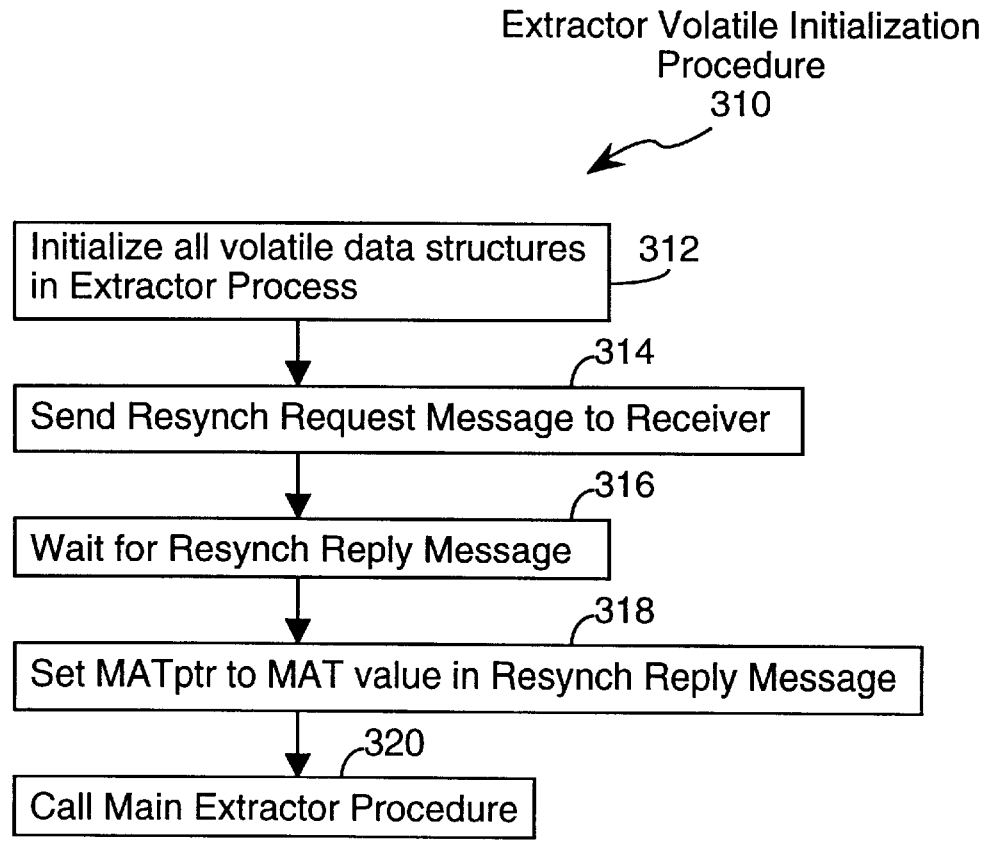
Figure 6C:
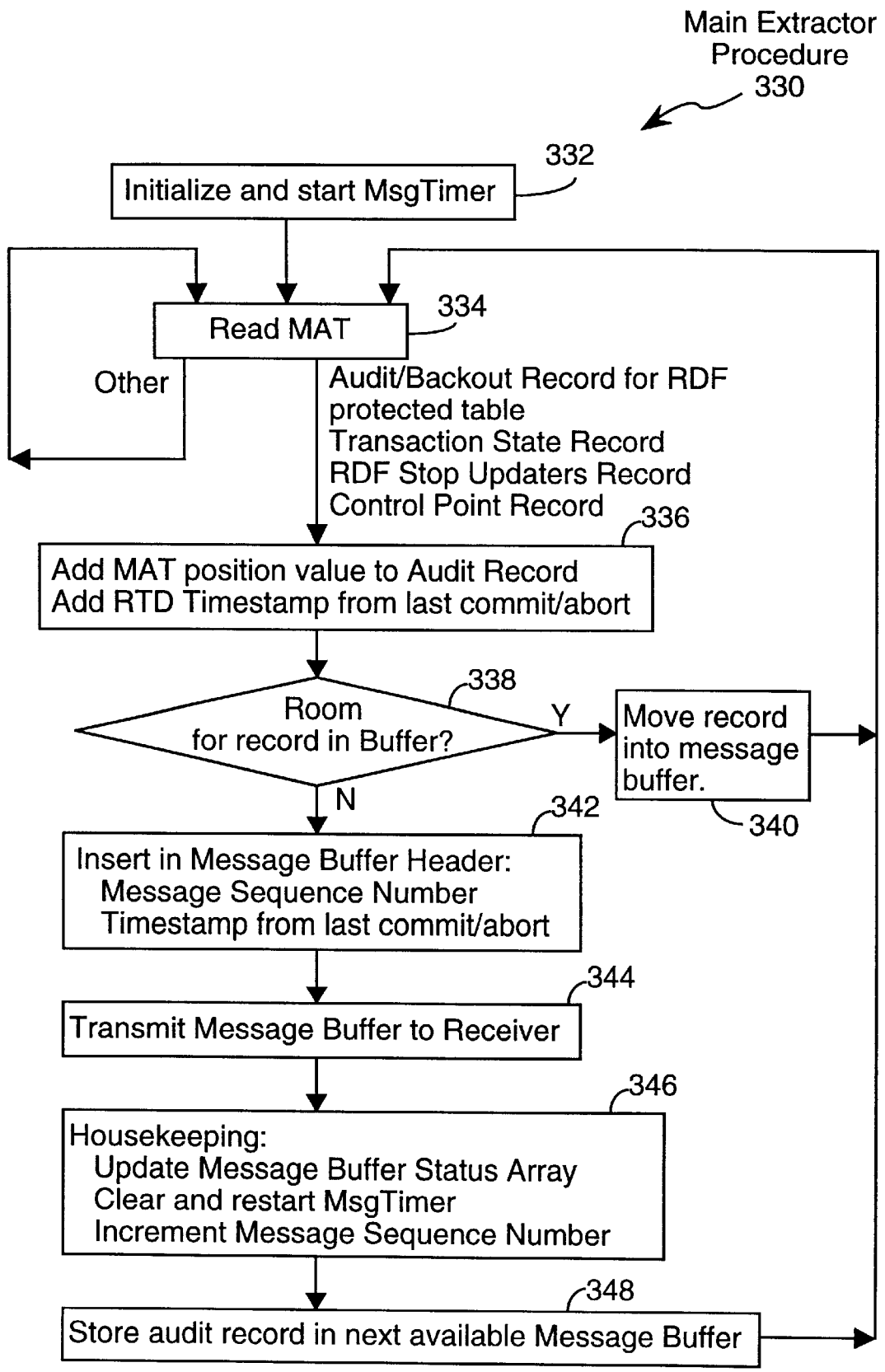
Figure 6D:
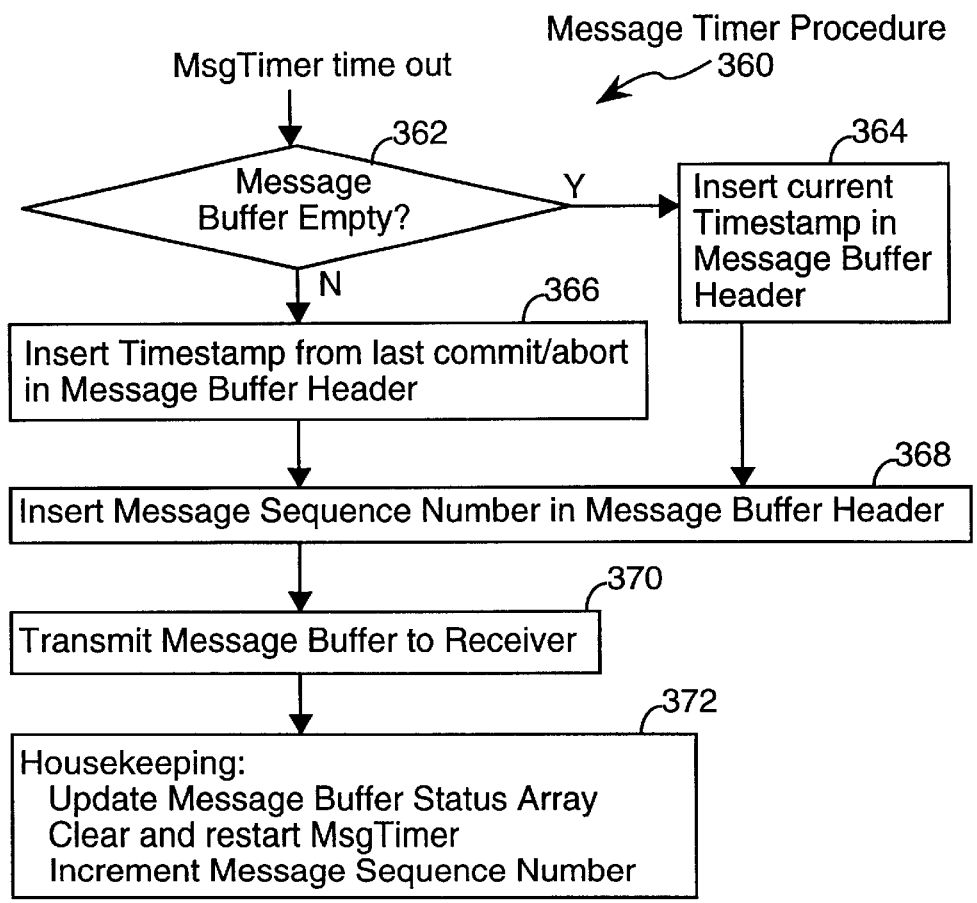
Figure 6E:
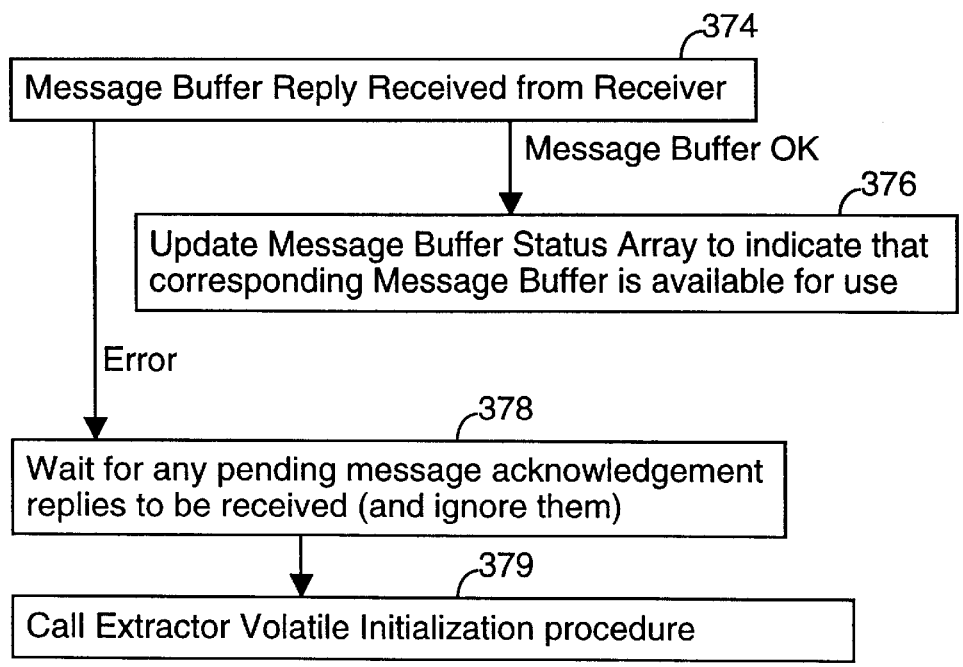

The purpose of the Message Timer is to ensure that audit image records are transmitted to the Receiver process in a timely fashion, even when the rate at which audit records are generated for RDF protected files is low. Referring to FIG. 6D, when the Message Timer times out the Message Timer procedure 360 first checks to see if the current Message Buffer is empty (i.e., contains no audit image records) (362). If so, a timestamp indicative of the current time is inserted into the Message Buffer header 280 (364). If not, the timestamp value from the last commit/abort record, stored in RTD timestamp register 297, is inserted into the Message Buffer header (366). Then the current Message Sequence Number is inserted in the Message Buffer header (368) and the Message Buffer is transmitted to the Receiver (370). After transmitting the message buffer, the Message Buffer Status Array 294 is updated to indicate that the message buffer just transmitted in not available for use, the Message Timer is cleared and restarted, and the Message Sequence Number in register 295 is increased by one (372).

When the Extractor process receives a reply from the Receiver process acknowledging receipt of a message buffer (374), if the reply message indicates the message buffer was received without error, the Message Buffer Status Array 294 is updated to indicate that the message buffer identified in the reply message is available for use (376).

If the reply message received by the Extractor process from the Receiver process indicates that the Extractor must restart, then the Extractor and Receiver must resynchronize with each other. The Receiver process tells the Extractor process to restart whenever (A) a message with an out-of-sequence Message Sequence Number is received, and (B) whenever the Receiver process starts up after a failover or return of control back to the primary Receiver process from the backup Receiver process (sometimes called a CheckSwitch). When the Extractor process receives an error condition reply message from the Receiver process that indicates the need to resynchronize, it waits for any pending message acknowledgment replies to be received for any other message buffers transmitted prior to receipt of the error condition reply message, and it ignores those reply messages (378). Then the Extractor process calls the Extractor Volatile Initialization procedure (379) so as to resynchronize the Extractor process with the Receiver process.

Detailed Description of Receiver Process

The primary data structures used by the Receiver process 132 in the preferred embodiment are shown in FIGS. 7A–7G. As stated earlier, the Receiver process durably stores a Receiver context record 270 and a set of Image Trail context records 271 on a nonvolatile (disk) storage device 272 on a periodic basis. The Receiver context record 270 includes a Receiver.StopUpdatersCnt count value 391, a Takeover_Completed flag 391A (used to indicate when an RDF takeover operation has been completed), a NumNode array 391B and previous SysTxList 391C (used for purging old image trail files).

Each image trail's context record 271 includes a MAT position, MIT position, the next write position. In some circumstances, the Receiver context record 270 and a set of Image Trail context records 271 may be collectively called the Receiver context record or Receiver context records, since these context records are collectively used to enable the Receiver process to restart itself and to resynchronize with the Extractor process.

Figure 7D:
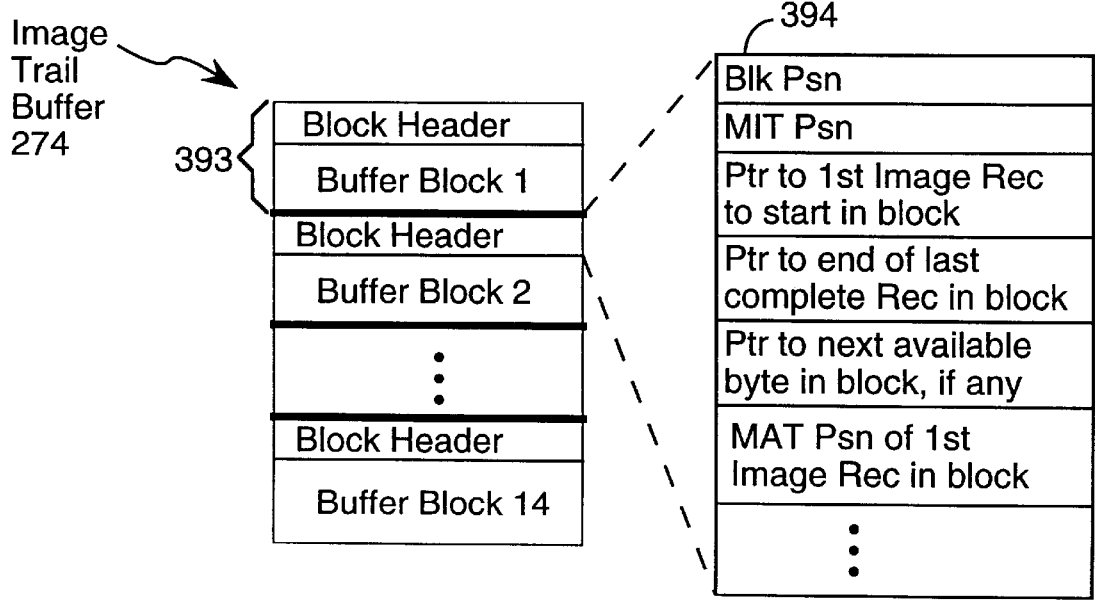

Two image trail buffers 274 are used for each image trail, and these are used in alternating fashion. Referring to FIG. 7D, each image trail buffer 274 consists of fourteen blocks 393 of data where the size of each block is 4 K bytes. Each 4 K block 393 begins with a block header 394 that includes:

the block's file storage location consisting of the relative byte address (rba) of the beginning of the block with respect to the beginning of the image trial file;

a Master image trail (MIT) position indicator, indicating the location of the MIT block in which the Receiver last wrote a commit/abort record before any audit records were stored in the current image trail block 393;

a pointer to the first audit image record to start in the buffer block (i.e., in almost all circumstances the first image record to start in the buffer will not be stored starting at the beginning of the body of the buffer block);

a pointer to the end of the last record to complete in the block;

a pointer to the next available byte in the block (if there is one); and the MAT position of the audit image record at the beginning of the buffer block (which will usually begins in an earlier block).

Audit image records rarely conform exactly to buffer block boundaries, and therefore the audit image record at the end of one buffer block usually continues at the beginning of the next, as shown in FIG. 15C.

A typical MIT position value would be "10, 8192", where the "10" represents the file sequence number within the corresponding sequence of image trail files, and the "8192" represents a relative byte offset from the beginning of the image trail file to a block header.

As explained earlier, every audit record shipped to the Receiver process 132 has a MAT position value inserted in it by the Extractor process. The MAT position in an image trail context record 271 indicates the MAT position of the last audit record durably stored in the image trail file.

The MIT position in an image trail context record 271 indicates a MIT position associated with the last durably stored image trail block. This is the MIT position in the last 4 k block header of the last image trail buffer stored before the image trail context record 271 was last stored.

Furthermore, each image trail buffer 274 is written to the corresponding disk file only (A) when the image trail buffer 274 is full (i.e., contains 52 K of data) or (B) when the Receiver process performs a periodic flush operation. Each time data from any image trail buffer 274 is written to disk, the disk file location for the next write to the image trail file (i.e., the disk address for the current end of the image trail file) is stored in the appropriate field of the image trail context record 270. However, as will be described below, the image trail context record is durably stored once every M seconds, where M is the number of seconds between executions of the Receiver context save procedure.

The Receiver.StopUpdatersCnt 391 is a count value that is incremented each time the Receiver encounters a Stop-Updaters record in a received message buffer whose MAT value is higher than the MAT position for at least one image trail. This will be explained in more detail below.

Referring to FIG. 7E, the image trail status array 392 stores, for each image trail, a set of buffer location information, the MAT value of the last record stored in that image trail, a Mellow flag, and the current limit position (i.e., the logical end of file). The buffer position information for an image trail includes pointers to the two buffers used by the image trail, an index indicating which of the two buffers is currently being written to, a pointer to the current block being written to, and a pointer (or offset) to the position within that block at which the next image record for the image trail will be written. The buffer position information is updated every time an audit record is added to an image trail buffer. The Mellow flag is used in association with the durable storage of image trail context records, as is described in more detail below with reference to FIGS. 8C and 8J. The limit position indicates the last record in the image trail that should be read by any Updater processing the audit records in the image trail.

The Receiver process also stores in memory a "Next Message Sequence Number" 396, a "restart MAT position" 398, an "ExpectStopUpdate" flag 399, and a Takeover_Mode flag 399A. The Next Message Sequence Number 396 is the message sequence number the Receiver expects to see in the next message buffer and is normally incremented by one after each message buffer is received. During normal operation, the restart MAT position 398 is set equal to the highest MAT value of the audit records in the last message buffer that was properly sequenced and successfully received from the Extractor. Whenever the Receiver process is started or restarted, however, the restart MAT position 398 is initially set to the lowest of the MAT position values stored in the image trail context records 271. The Expect-StopUpdate flag 399 is a flag set in response to a special "Expect Stop Update" message from the Monitor process just prior to a StopUpdaters audit record being moved by the Extractor process into its current message buffer.

The Takeover_Mode flag 399A is set whenever the backup portion of the RDF system is performing an RDF takeover operation. When the Takeover_Mode flag is set, the Receiver and Updaters operate differently than usual, as will be described in more detail below.

Referring to FIG. 7F, an Updater table 400 is used by the Receiver to map Updaters to their image trails, and also to keep track of which Updaters have sent it messages.

Figure 7G:
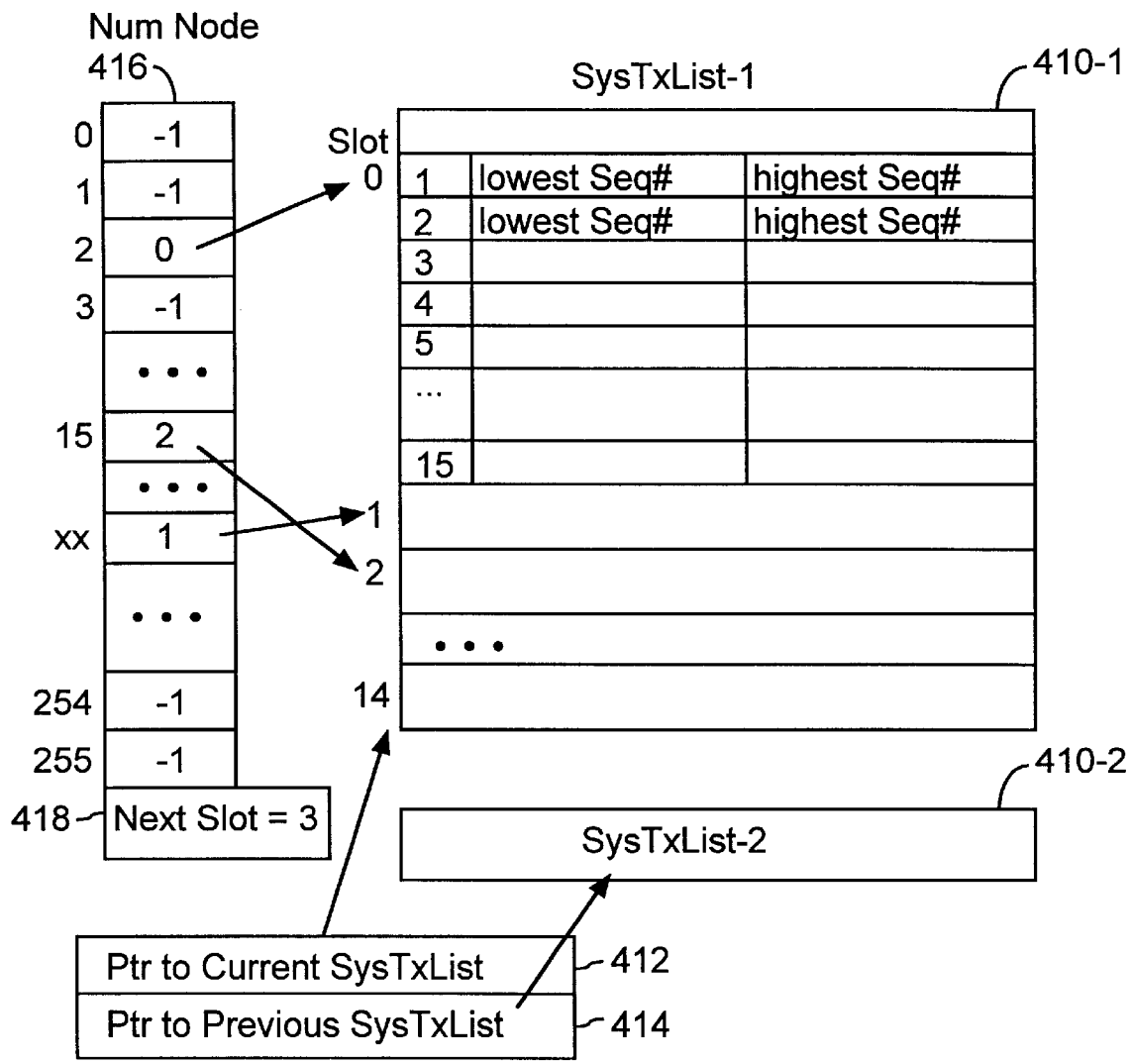

Referring to FIG. 7G, the Receiver uses a pair of "system transaction list" data structures SysTxList 410 to keep track of the range of transaction IDs for active transactions being handled by each processor of the transaction management facility 102 (see primary system 100, FIG. 1). The transaction management facility TMF 102 may include multiple nodes, and each node can include up to sixteen processors. Furthermore, each processor in the TMF independently assigns monotonically increasing sequence numbers to the transactions it executes. While the number of parallel processors is potentially high, in practice the number of nodes in the TMF rarely exceeds four.

Two pointers 412, 414 are used to point to the current and previous versions of the system transaction list 410. The current system transaction list is the one that is currently being updated by the Receiver process for the current TMP control period, while the previous system transaction list indicates the range of transaction IDs for active transactions for the previous (i.e., complete) TMP control period. The actual values stored in the SysTxList slots are just the lowest and highest sequence numbers of active transactions for the relevant TMP control point period. The Node and Processor portions of the transaction IDs are not stored in SysTxList because they are indicated by the slot and subslot of the SysTxList where those values are stored, along with the NumNode entry pointing to the slot.

A NumNode array 416 is used to map the node numbers of the nodes in the TMF 102 to slots in the current SysTx-List. Null entries in NumNode are indicated by a predefined value, such as −1. Each non-null entry of NumNode indicates the slot of the system transaction lists 410 to be used for the corresponding node of the primary system. For instance, if NumNode(15)=2, that indicates that node 15 of the primary system has been mapped to slot 2 of the system transaction lists 410 for purposes of keeping track of the range of active transactions.

The NextSlot field 418 of the NumNode array indicates the next unused slot of the system transaction lists 410.

Referring back to FIG. 7A, the Receiver Context record 270 includes a copy 391B of the NumNode array and a copy 391C of the previous SysTxList. The Purger Context record (not shown) includes a flag called the Undo List Written flag, the purpose of which will be explained below.

Figure 7H:
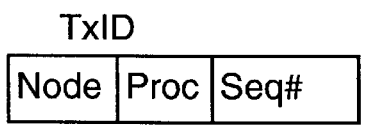

Referring to FIG. 7H, each transaction ID has three components:

TxID.Node, and which identifies the TMF node on which the transaction was executed;

TxID.Proc, which in conjunction with TxID.Node identifies the TMF processor on which the transaction was executed;

TxID.Seq#, which is the sequence number assigned to the transaction by the TMF processor that executed the transaction.

Referring to FIGS. 8A–8K, the Receiver process 132 works as follows.

Figure 8A:
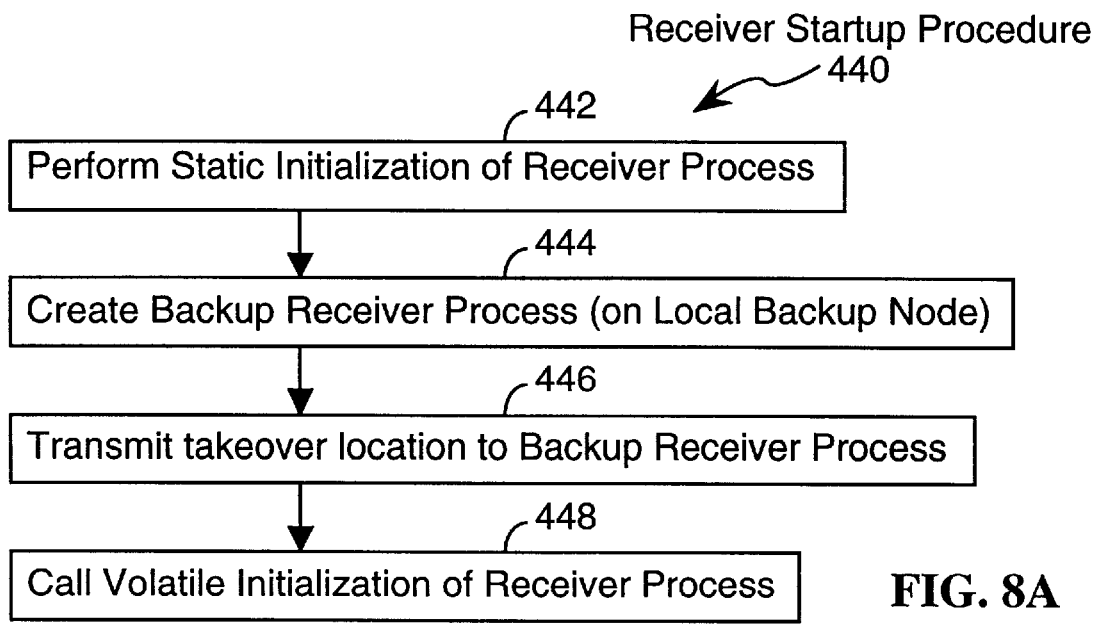
FIGS. 8A, 8B, 8C, 8D, 8E, 8F, 8G, 8H, 8I, 8J and 8K are flowcharts of procedures executed by the Receiver process in a preferred embodiment of the present invention.

Referring to FIG. 8A, the Receiver Startup Procedure 440 is called whenever the Receiver process 132 or its backup is started, as in the case of a failover or a transfer of control back to the primary Receiver process 132 from the backup Receiver process. The Startup procedure begins by performing a "static initialization" of the Receiver process (442), which means that all static data structures used by the Receiver process are allocated and initialized. The startup procedure then creates a backup process (444). Then a checkpoint operation is performed in which a takeover location is transmitted to the backup Receiver process (446). The takeover location is, in essence a program address, and in the preferred embodiment the takeover location is the program location at which execution of the Receiver volatile initialization procedure 450 begins. Finally, the Receiver Startup procedure calls (448) the Receiver Volatile Initialization procedure 450.

Figure 8B:
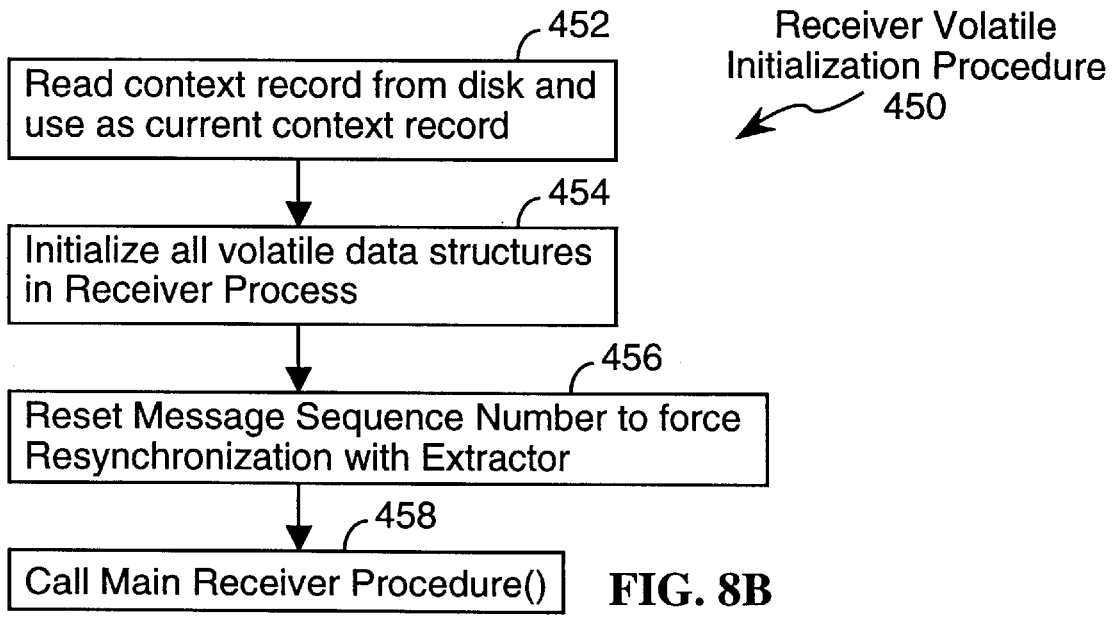
Figure 8C:
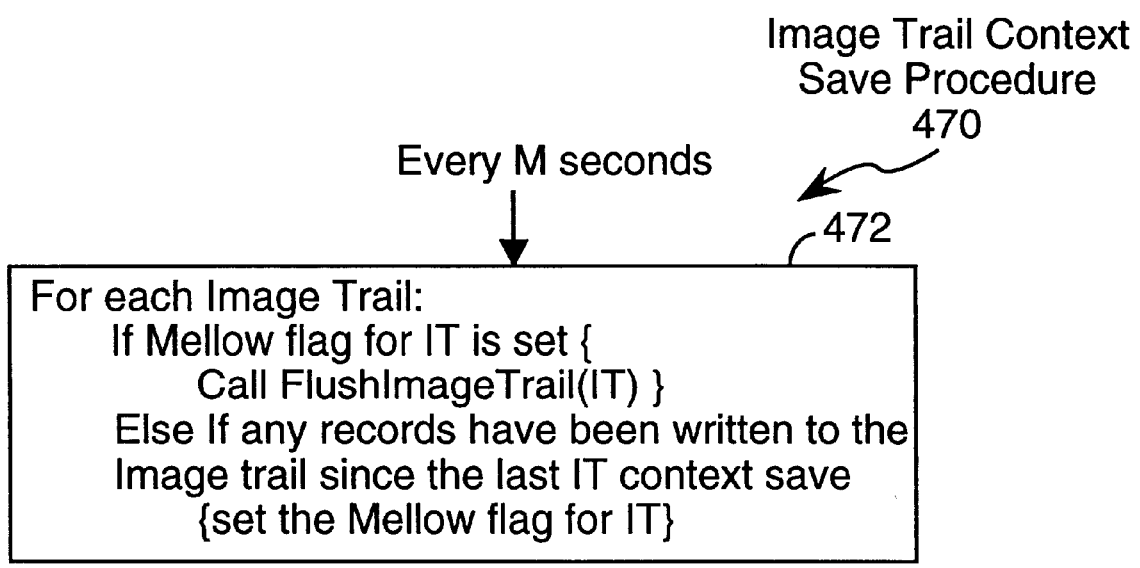

Referring to FIG. 8B, the Receiver Volatile Initialization procedure 450 is called during startup by the Receiver Startup procedure 440. The Receiver Volatile Initialization procedure 450 begins by reading the last stored Receiver context record and the last stored image trail context records from disk and using those context records as the Receiver's current context records in volatile memory (452). Then the Receiver Volatile Initialization procedure allocates and initializes all volatile data structures (454) used by the Receiver process, including the image trail buffers 274, the image trail status array 392, the Updater status array 400, the NumNode array 416 and the current and previous system transaction lists 410. Then the Receiver Volatile Initialization procedure sets the Receiver's Expected Message Sequence Number to "1" (456). This will force the Receiver and Extractor to resynchronize, unless the Extractor is starting up at the same time such as in response to a "Start RDF" command. Finally, the Volatile Initialization procedure calls (458) the Main Receiver procedure 460.

Referring to FIGS. 8C–8K, the Main Receiver procedure 460 includes a subprocedure 470 for periodically flushing image trail buffers to disk and for saving the Image Trail context records. This subprocedure is called every M seconds, where M is preferably a value between 5 and 15 and is typically set to 5. At step 472, the image trail context save procedure performs a "lazy" flush of image trail buffers to disk. In particular, it checks the Mellow flag for each image trail. For each image trail having a Mellow flag that is set, the FlushimageTrail procedure is called. For each image trail having a Mellow flag that is not set, but for which any records have been written since the last image trail context save for that image trail, the Mellow flag is set. The FlushImageTrail procedure is described below with reference to FIGS. 8H, 8I and 8J.

It is noted here that the Receiver's context record is durably stored on disk whenever the MIT's context record is saved by the FlushImageTrail and CompleteWriteInProgress procedures (described below with reference to FIGS. 8H and 8J).

Figure 8D:
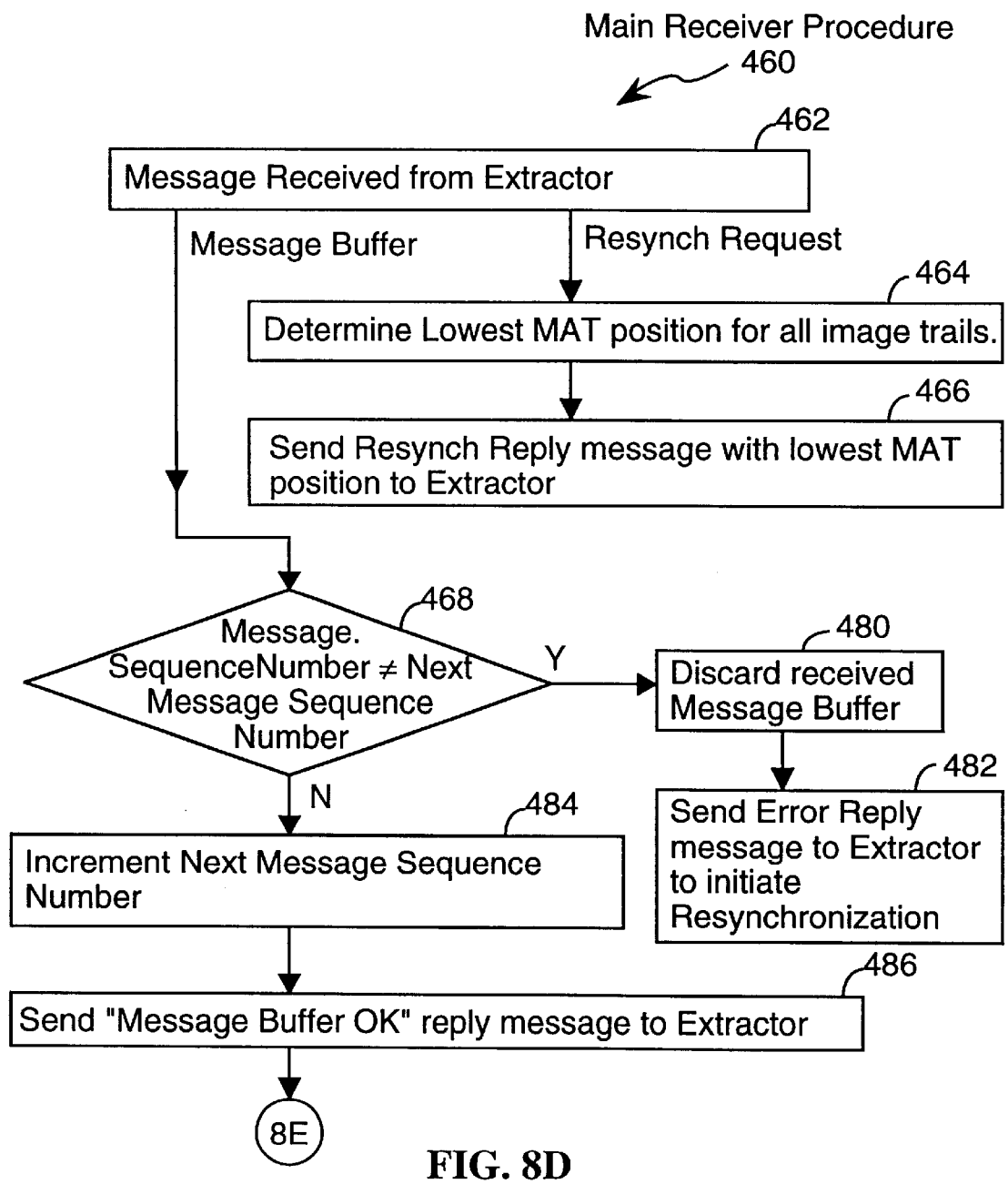
Figure 8E:
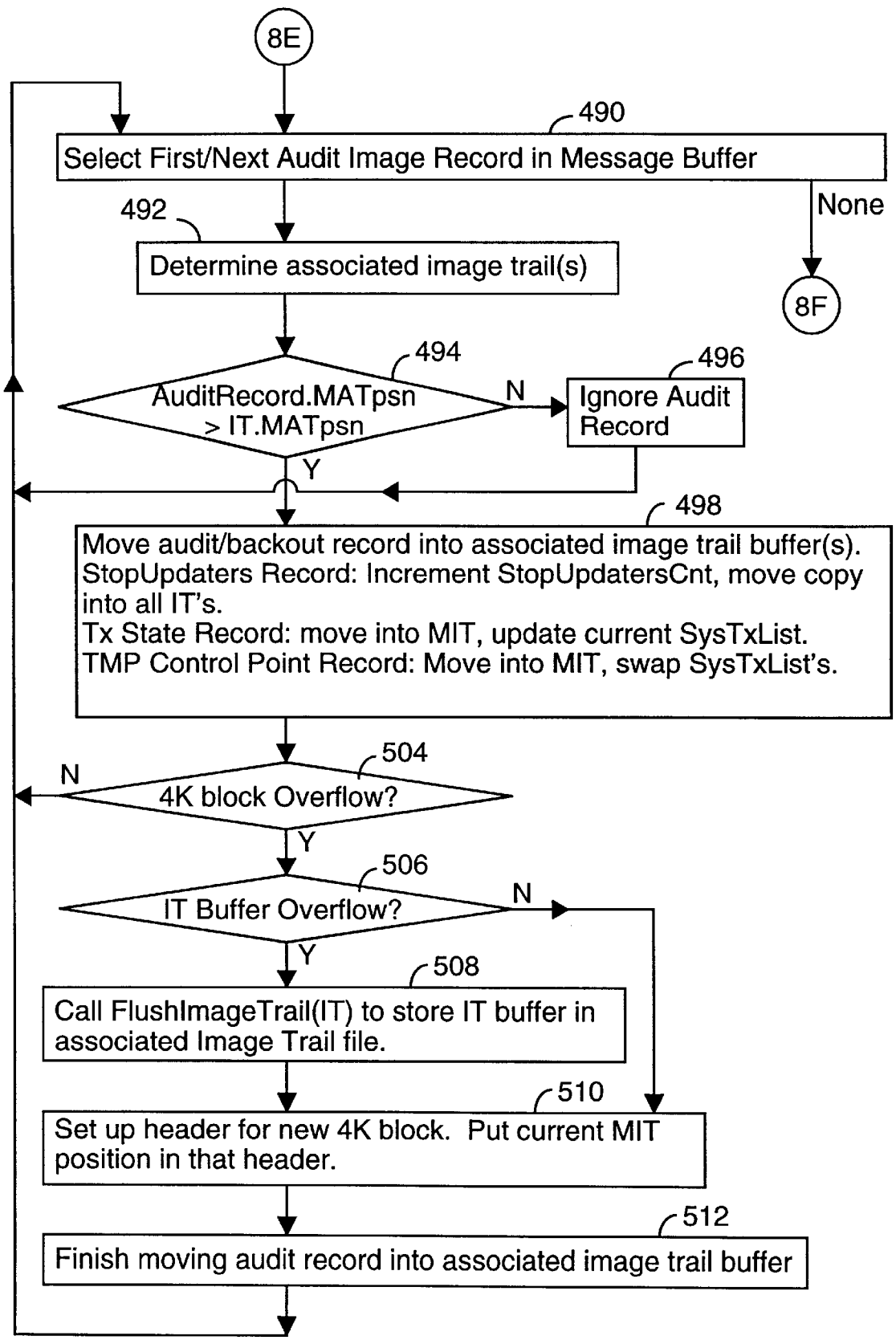
Figure 8F:
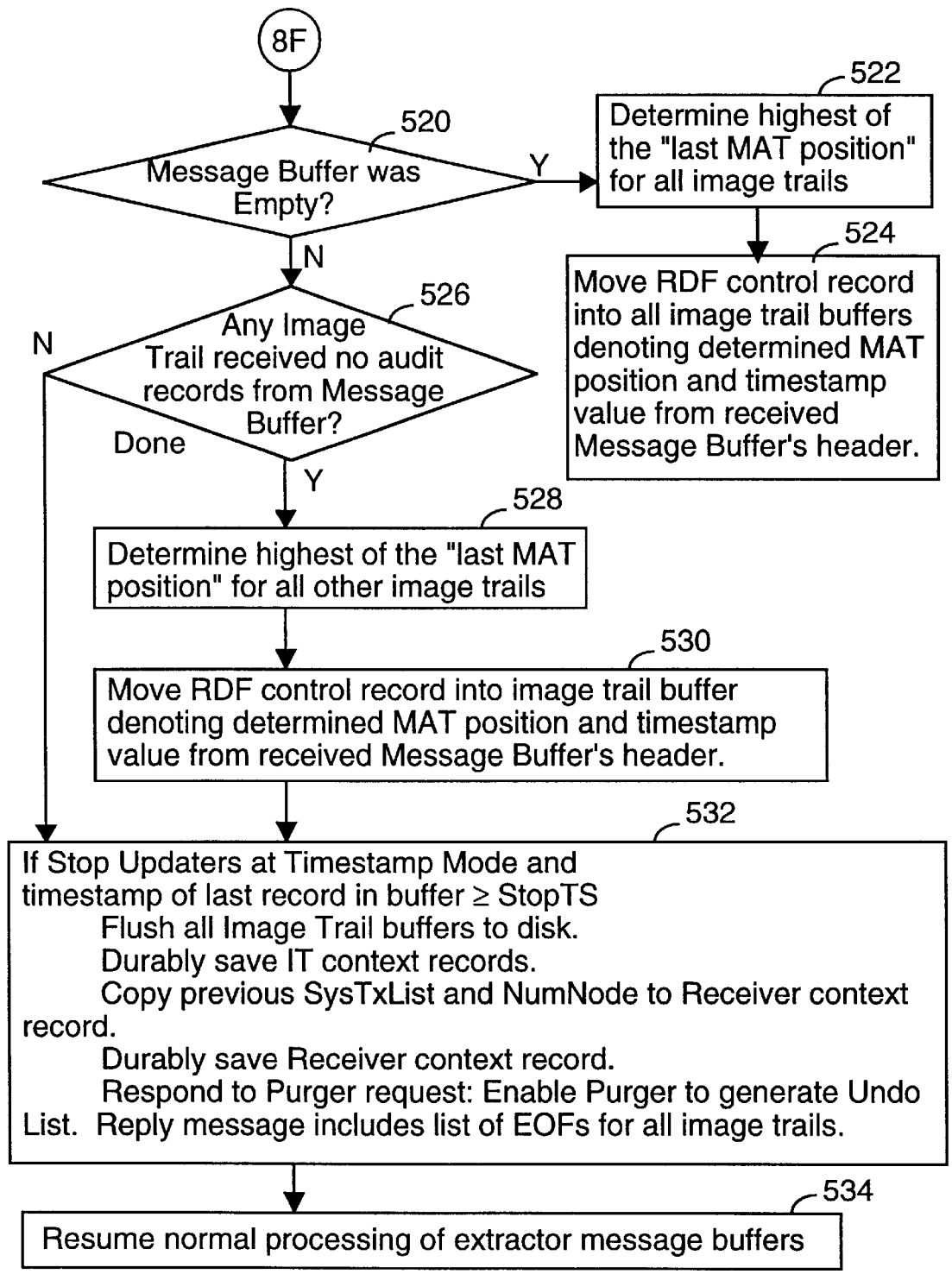
Figure 8G:
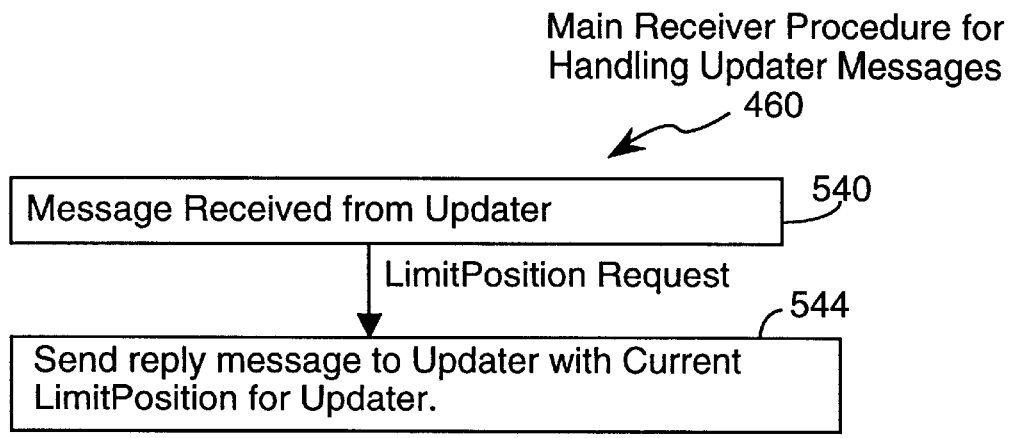
Figure 8H:
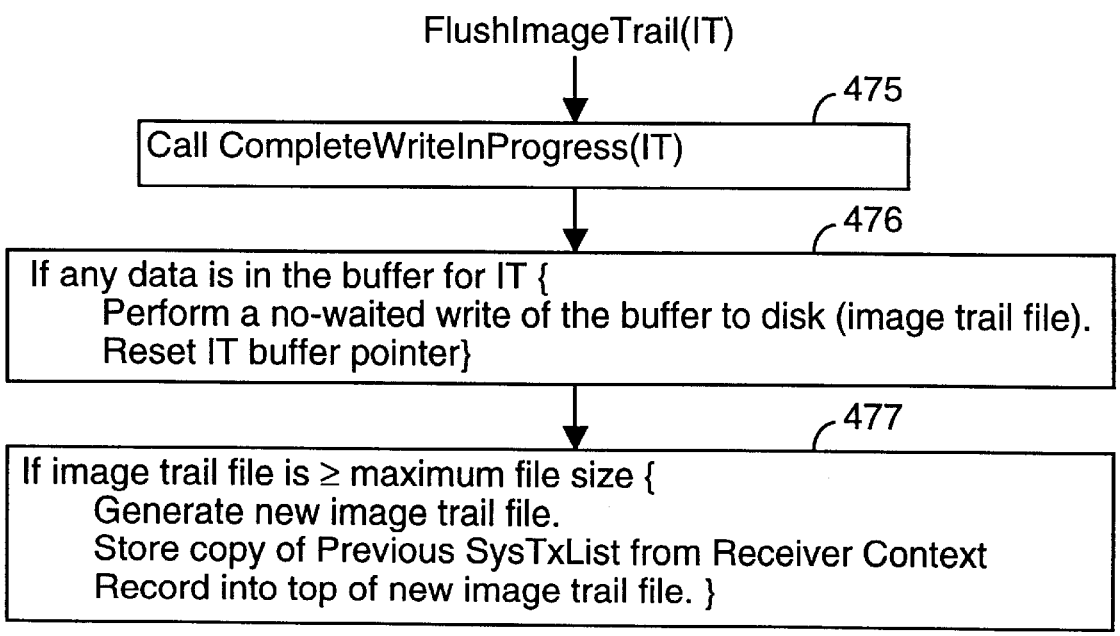

Referring to FIG. 8H, the FlushImageTrail procedure uses "no-waited writes" to write the contents of an image trail buffer to disk. When a no-waited write is initiated, the process initiating the write is not blocked. Instead it continues with execution of the program(s) it is currently executing without waiting for the write to complete. However, each time the FlushImageTrail procedure is called for a particular image trail, the first thing it does is call the CompleteWriteInProgress procedure (shown in FIG. 8I) to ensure that any previously initiated write for that image trail has completed successfully (step 475). Then the FlushImageTrail procedure performs a no-waited write on the image trail buffer to disk, and resets the image trail's buffer position information to reference the beginning of the other buffer 274 for the image trail (step 476). Because of the operation of the CompleteWriteInProgress procedure, the other buffer 274 for the image trail is known to be available for use when step 476 is executed.

Figure 8I:
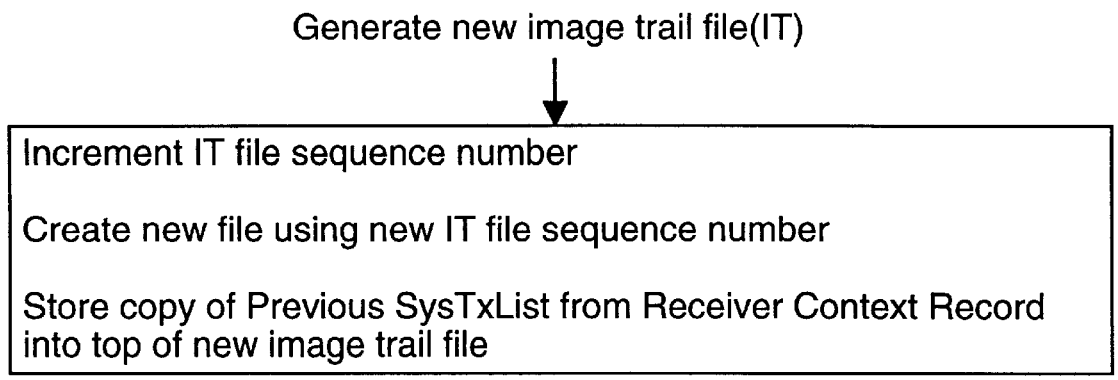

If the current image trail file is at or above a predefined maximum file size, a new image trail file is generated (477). Referring to FIG. 8I, when a new image trail file is to be generated, an image trail file sequence number is incremented and the new file is generated using the sequence number as part of its file name. Then, a copy of the previous SysTxList from the receiver context record is stored in the top of the new image trail file.

Figure 8J:
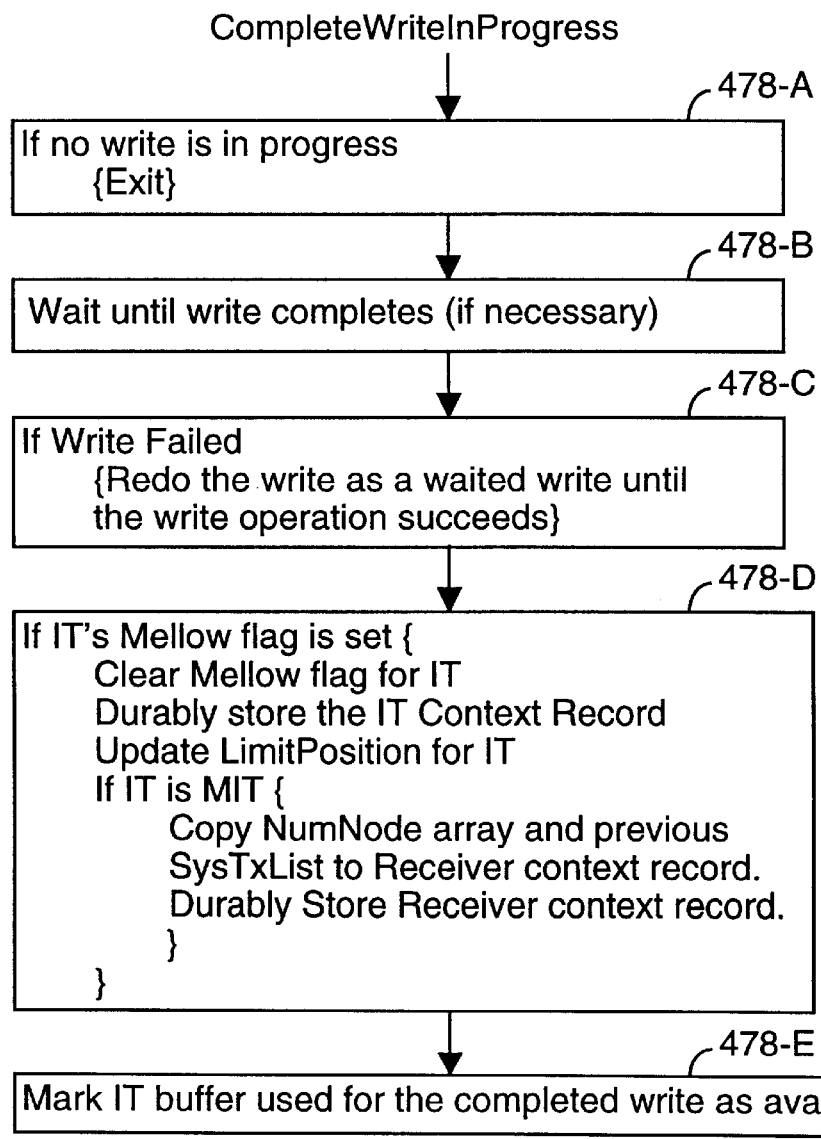

Referring to FIG. 8J, the CompleteWriteInProgress procedure immediately exits if no write for the specified image trail is in progress (step 478-A). Also, if a previously initiated write is still in progress, the procedure waits until it completes (step 478-B). Also, if a previously initiated write has failed, the write operation is repeated using a waited write operation until the write successfully completes (step 478-C). Next, if the Mellow flag of the image trail being processed is set, the Mellow flag is cleared, the Image Trail context record is durably stored and the LimitPosition for the Image Trail is updated (step 478-D).

If the image trail being processed is the MIT, the NumNode array and previous SysTxList are copied into the Receiver context record, and the Receiver context record is durably stored (478D).

Finally, the image trail buffer associated with the write operation that has completed is marked as available so that it can be used once again by the Receiver process (step 478-E).

The Receiver context save and image trail flushing procedures shown in FIGS. 8C, 8H, 8I and 8J are very efficient, enabling the Receiver to manage many image trails and save context in a timely manner. This can be best appreciated by reviewing the operation of these procedures in two exemplary situations. For each situation discussed, it is assumed that there are three image trail buffers: MIT, IT1, and IT2. Situation A. The context save timer pops and the Receiver's context save procedure is called. Because the mellow flags for the image trails are not set, they are now set and the Receiver immediately resumes processing new audit sent by the Extractor.

When the context save timer pops again and the context save procedure is called, it invokes the FlushImageTrail procedure for each image trail because the mellow flag is set for each of the image trails. Since no writes are currently outstanding to each image trail file, the CompleteWriteInProgress returns immediately, and no waited writes are initiated to store the current image trail buffer for each image trail to disk. The alternate buffer for each trail becomes the new current buffer. Because these writes are no-waited, the Receiver immediately returns to processing new data from the Extractor, storing said image audit in the new current buffers.

When the Receiver's context save timer pops again and the Receiver context save procedure is called, the mellow flag is still set for each trail. Therefore the FlushImageTrail routine is called for each image trail, which in turn calls the CompleteWriteInProgress routine for each image trail. Because these writes were initiated previously, the Receiver does not actually have to wait. Assuming each previously initiated buffer write completed without error, the mellow flag is now cleared for each image trail and the context record for the image trails are written to disk using a waited write operation. However, since the context records are small, these writes are completed almost immediately. Each image trail's context record on disk now reflects all data just written. Program control then returns to the Receiver's context save procedure and then to the Receiver's main procedure, where it resumes processing new data from the Extractor.

The context save and FlushImageTrail procedures almost never wait for disk operations to be performed because the image trail buffer write operations complete between executions of the context save procedures. As a result, the Receiver's processing of data from the Extractor is virtually uninterrupted by the image trail buffer flushing and context saving operations. This remains true even if the Receiver is servicing as a hundred image trails.

Situation B. In this situation, so much audit is being sent to the Receiver that an image trail buffer fills before the context save timer pops. When a buffer write operation is initiated for each image trail, the alternate buffer becomes the current buffer.

When the context save timer pops, the context save procedure is called. Because the mellow flag is not currently set, it is now set and the Receiver returns to processing new data from the Extractor. This allows more records to be stored in the current image trail buffer.

If the current image trail buffer is filled before the next Receiver context save, the FlushImageTrail procedure.is called. Before starting the write operation, the CompleteWriteInProgress procedure is called. Because the previous write was no waited and was issued previously, that write will already have completed and the Receiver does not have to wait for that write operation to complete. The CompleteWriteInProgress procedure clears the image trail's mellow flag, and durably stores the image trail's context record. Then the FlushImageTrail procedure issues a new no waited write for the full image trail buffer, makes the other buffer the new current buffer, and returns immediately to processing new audit from the Extractor.

When the context save timer pops again and the Receiver's context save procedure is called, the mellow flag is set and the Receiver returns immediately to processing new audit from the Extractor.

When the current image trail buffer fills again and must be written to disk, the CompleteWriteInProgress procedure is called by the FlushImageTrail procedure. Again, there was a previous write, but it has already completed. Therefore the CompleteWriteInProgress procedure clears the mellow flag and updates and durably stores the image trail's context record, which now reflects all audit image records written to disk by the write that just completed. The FlushImageTrail procedure issues a new no waited write for the full image trail buffer, the buffer whose contents have already been written to disk is made the new current buffer, and then the Receiver returns immediately to processing new audit from the Extractor.

Thus, when under pressure from high amounts of audit being sent by the Extractor, the Receiver is able to update its context quickly and resume processing audit image records, only having to wait for the image trail context write to complete, but not having to wait at all for image trail buffer writes to complete. This is as effective for a hundred image trails as it is for one.

The Receiver process 132 is a "passive" process in that it does not initiate messages to other processes. Rather it only responds to messages from the Extractor process 130, messages from the Updater processes 134, and from the Monitor process 140.

Referring to FIGS. 8D, 8E and 8F, when a message is received from the Extractor process (462), if the message is a Resynch request message, the Receiver determines which of the MAT positions listed in Image Trail context records is lowest (464), and sends a Resynch Reply message to the Extractor with the determined lowest MAT position embedded in the reply message (466).

If the received Extractor message is a message buffer message, the message sequence number (denoted Message.SequenceNumber) in the received message is compared with the locally stored Next Message Sequence Number (468). If the received message sequence number is not equal to the locally stored Next Message Sequence Number, the received message buffer is discarded (480) and an Error Reply message is sent to the Extractor (482) indicating the need to re-establish synchronization.

If the received message sequence number is in sequence, the locally stored Next Message Sequence Number is incremented by one (484) and a "Message Buffer OK" reply is sent to the Extractor (484). A message buffer identifier is associated with the received message and is also associated with the reply message so that the Extractor can properly update its message buffer status table by marking the acknowledged message buffer as available.

Next, all the audit image records in the received message buffer are processed in sequence (490). For each record, the image trail associated with the record is determined (by determining the database volume updated on the primary system, determining the Updater responsible for replicating RDF protected files on that volume and then determining the image file associated with that Updater) (492). Next, the MAT position (AuditRecord.MATpsn) in the audit record is compared with the MAT position (IT.MATpsn) for the identified image trail (494). If the audit record's MATpsn is not larger than the image trail's MATpsn, the audit record is ignored (496) because it has already been processed by the Receiver. Otherwise, the audit record is moved into the identified image trail buffer, and the associated image trail's current MAT position (IT.MATpsn in the image trail status array 392) is updated to this audit record's MAT position (498).

If the received record is a "Stop Updaters" record, step 492 determines that the record is associated with all the image trials. The Stop Updaters record is written to the image trail buffer for each image trail whose MAT position (i.e., the MAT position of the last record written to the image trail) is less than the Stop Updaters record's MAT position (AuditRecord.MATpsn). Normally, unless there has been a recent Receiver process failure, the Stop Updaters record will be written to every image trail. Next, all the image trails buffers to which the Stop Updaters record was written are flushed to disk and the corresponding Image Trail context records are updated and durably stored to disk. Once the Receiver detects that the image trail disk cache flushes and context record saves have completed, the Receiver increments the Receiver.StopUpdatersCnt 391 count value in its context record and durably stores the Receiver context record to disk. By following these steps the Receiver ensures (A) that each Stop Updaters record is durably stored to all image trails, and (B) that the Receiver.StopUpdatersCnt 391 count value is incremented once, and only once, for each distinct Stop Updaters record.

If the record is a transaction state record it is stored in the master image trail (498). Further, if the record is a transaction state record other than a commit or abort record, the Receiver also updates the current SysTxList by calling the Update Current SysTxList procedure (498), described in more detail below with respect to FIG. 8K. This procedure updates the current SysTxList, when necessary, so as to indicate the full range of transaction IDs for active transactions during the current TMP control point period.

If the received record is a TMP Control Point record, step 492 determines that the record is associated with the MIT, where it is written in step 498. Further, if the received record is a TMP Control Point record, the Receiver swaps the SysTxList pointers, making the current SysTxList the previous SysTxList, and making the previous SysTxList into the current SysTxList. Furthermore, the current SysTxList is cleared so as to store all null values (498).

If moving an audit image record into an image trail buffer would overflow a 4 K byte block in the image trail buffer (504), special processing is required (see description of steps 510, 512 below). Furthermore, if moving the audit record into the image trail buffer would overflow the last block in the image trail buffer (506) the entire image trail buffer through the last 4 K block is durably stored in the associated image trail file (508) by calling the FlushimageTrail procedure (see FIGS. 8H, 8I and 8J).

If a 4 K byte block has been filled, the procedure sets up a new 4 K block either in the same buffer if there is room for another 4 K block, or in the other buffer for the image trail if the current buffer has been filed. In either case, the following information is stored in the block header for the new block: the position of the block in the image trail file, the current MIT file position (which is the MIT file and block header position associated with the last audit record written to the MIT message buffer), a pointer to the first record (if any) whose beginning is located in the 4 K block, and the MAT position of the record located immediately after the block header (see earlier discussion of FIG. 7D). Then the process of moving the current audit record into the image trail buffer is completed (512) and processing of the next audit record (if any) in the received message buffer begins at step 490.

If the received message buffer was empty (520), the Receiver determines the highest of the MAT positions stored in the context records for all the image trails, which is equal to the MAT position of the last audit record received from the Extractor in the last message buffer received that contained any audit records. Then an "RDF control record" is moved into all the image trail buffers (524). The RDF control record denotes (A) the determined highest MAT position, and (B) the timestamp value in the received message buffer's header.

If the received message buffer was not empty (520), but if one or more image trails received no audit records from the current message buffer (526), the Receiver determines the highest of the MAT positions stored in the context record for all the other image trails (528), which is equal to the MAT position of the last audit record received from the Extractor in the current message buffer. Then an "RDF control record" is moved into each image trail buffer that did not receive any audit records (530). The RDF control record denotes (A) the determined highest MAT position, and (B) the timestamp value in the received message buffer's header.

If the backup system is in Stop Updaters at Timestamp mode and the last audit record in the buffer had a timestamp greater than or equal to the StopTS, then the Receiver performs the following sequence of tasks (532). It flushes all image trail buffers to disk and durably saves the image trail context records. It copies the NumNode array and the previous SysTxList (i.e., for the last complete TMP control interval) to the Receiver context record and durably stores the Receiver context record. Finally, the Receiver will have received a request message from the Purger, and the Receiver replies to that request with a message that includes the end of file positions for all image trails and that enables the Purger to generate the Undo List (see FIG. 12).

Referring to FIG. 8G, when a limit position message is received from any Updater process (540), the Receiver sends a reply message to the requesting Updater with the Limit-Position location for that Updater's image trail (544).

Updating the SysTxList Table

Figure 8K:
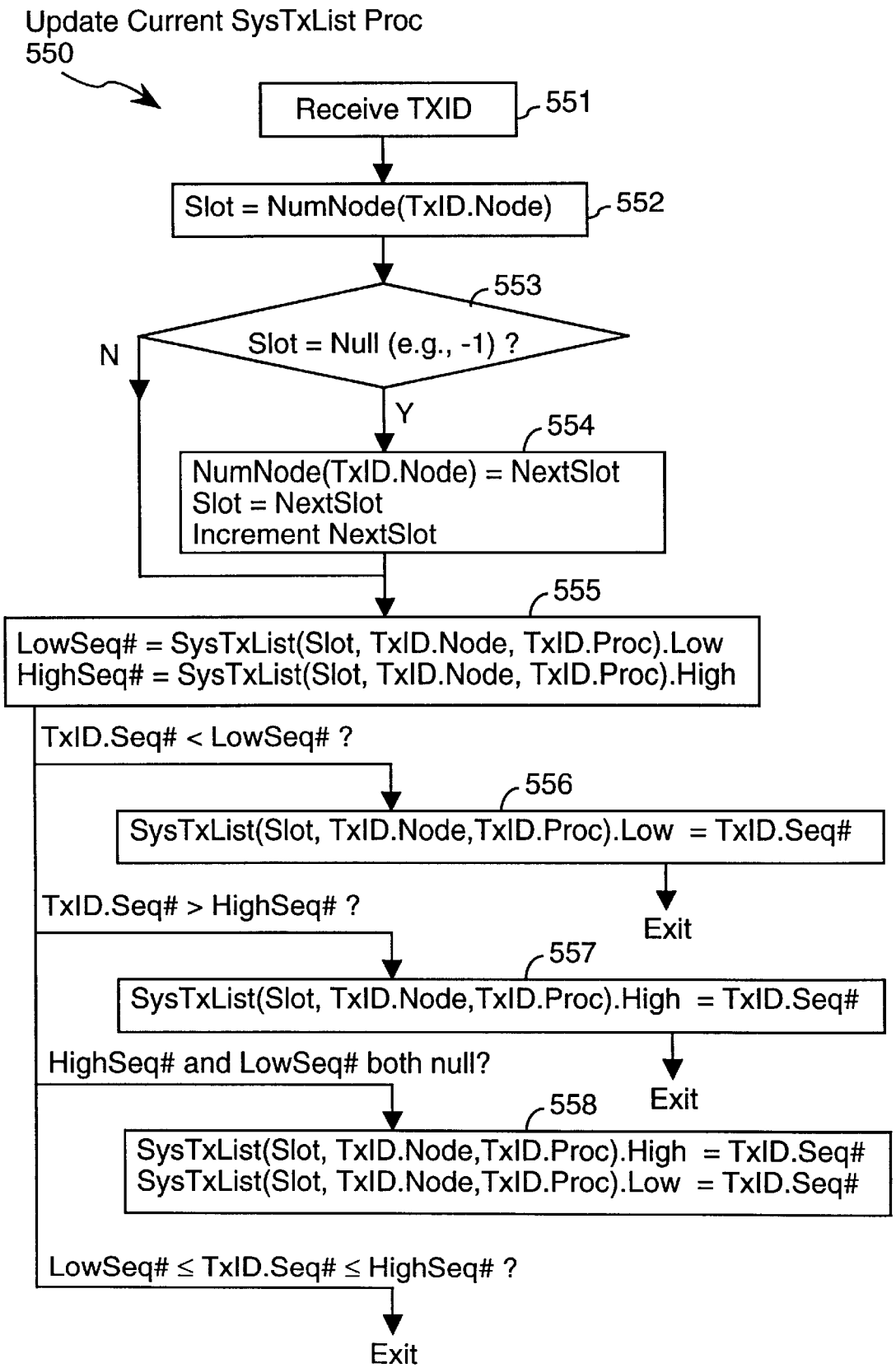

Referring to FIGS. 7G and 8K, the Update Current SysTxList procedure 550 is called by the Receiver to process each logical audit record and each transaction state record other than a commit or abort record. The Receiver passes just the transaction ID (TxID) of the record being processed to this procedure (551). The procedure uses the Node field of the received TxID to look up in the NumNode array the Slot of the SysTxList assigned to that node (552). If no slot has been assigned to the node (553-Y), a slot is assigned to it by storing the NextSlot value in the appropriate entry of the NumNode array and then incrementing NextSlot (554).

The low and high sequence numbers for the Node and Processor associated with the received transaction ID are read from the SysTxList (555) (i.e., at the slot and subslot of SysTxList for that Node and Processor) and then compared with the Seq# field of the received transaction ID. If the Seq# field of the received transaction ID is less than the low sequence number stored in the SysTxList for that Node and Processor, the low sequence number field is replaced with the value of the Seq# field of the received transaction ID (556). Similarly, if the Seq# field of the received transaction ID is higher than the high sequence number stored in the current SysTxList for that Node and Processor, the high sequence number field is replaced with the value of the Seq# field of the received transaction ID (557). If the low and high sequence numbers stored in the SysTxList are null, the Seq# field of the received transaction ID is stored in both (558).

Detailed Explanation of Updater Processes

Figure 9:
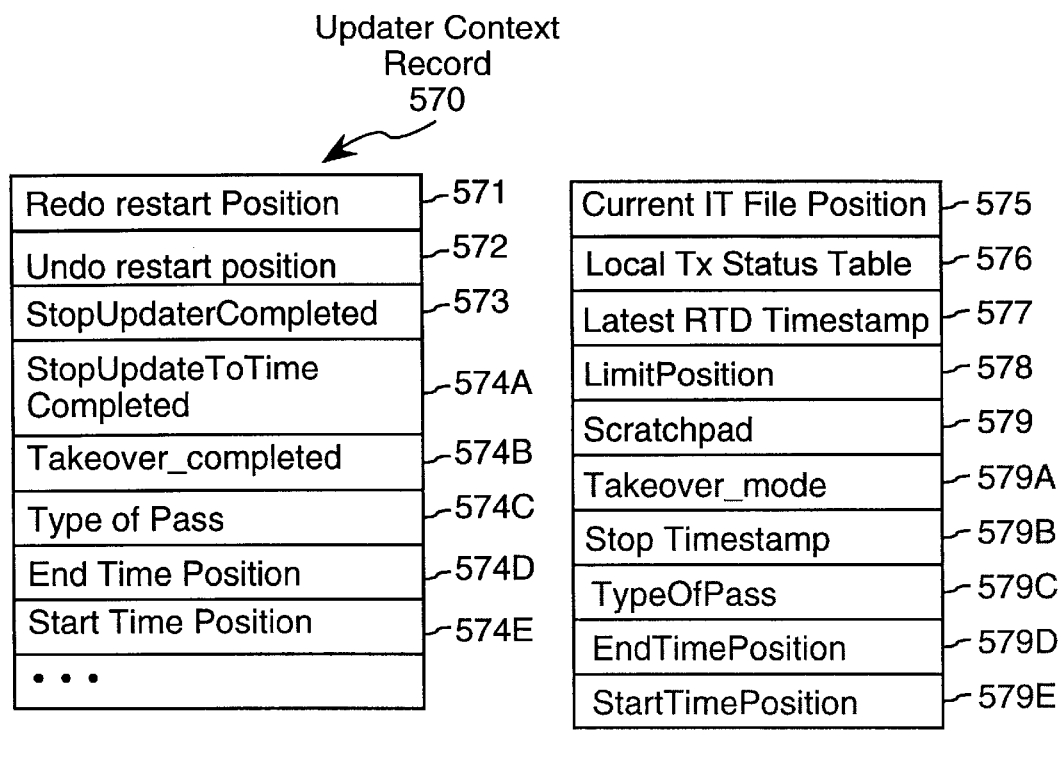
FIG. 9 is a block diagram of data structures, stored in primary memory, used by each Updater process in a preferred embodiment of the present invention.

The primary data structures used by each Updater process 134 in the preferred embodiment are shown in FIG. 9. Each Updater process durably stores a context record 570 on a nonvolatile (disk) storage device on a periodic basis (e.g., once every 2 to 10 minutes, with 5 minutes being preferred). As shown in FIG. 9 the Updater context record includes:

a Redo restart position 571, indicating the position of the record immediately following the last image trail record processed by the Updater before the last Updater context save operation during a Redo pass;

an Undo restart position 572, indicating the next image trail record to process during an Undo pass after the last Updater context save operation;

a StopUpdaterCompleted flag 573, which is set when the Updater has stopped operation in response to reading a Stop Updaters record;

a StopUpdateToTime Completed flag 574A timestamp-based Restart IT position 574A, used to indicating where to restart processing image trail records after a performing a "Stop Updaters at Timestamp" operation;

a Takeover_Completed flag 574B that is set when the Updater completes processing all the records in its image trail during an RDF takeover operation;

a Type of Pass indicator 574C, which indicates whether the Updaters is performing a Redo pass or an Undo pass (as explained below);

an End Time Position 574D, which indicates the record last processed at the end of a Redo pass, while performing a stop Updater at timestamp operation; and a Start Time Position 574E, which indicates the last record to be undone during an Undo Pass, and thus indicates the first record to be processed (for redo) when the Updater is restarted after completing a Stop Updater at Timestamp operation.

Each Updater also stores in volatile memory a current image trail file position 575;

a local transaction status table 576;

a latest RTD (relative time delay) Timestamp value (577), equal to the last RTD timestamp of any image audit record processed by the Updater;

a LimitPosition image trail file position (578);

a scratch pad (579) for processing audit records;

a Takeover_Mode flag 579A for indicating if the RDF system is in takeover mode; and a Stop Timestamp 579B for indicating the timestamp limit on transaction updates to be applied by the Updater;

a TypeOfPass value 579C indicating whether the Updater is performing a Redo Pass or Undo pass; and an EndTimePosition 579D and StartTimePosition 579E for marking the End and Start image trail positions for an Undo Pass.

The RTD Timestamp value 577 is used by the Stop Updaters at Timestamp procedure discussed below. In addition, it is accessible by procedures executed on behalf of the Monitor process 140 for monitoring how far the Updaters are running behind the TM/MP 202, and thus how long it would take the RDF system 220 to catch up the backup database 124 with the primary database 108 if all transactions on the primary system were to stop.

Referring to FIGS. 10A–10F, the Updater processes 134 work as follows.

Figure 10A:
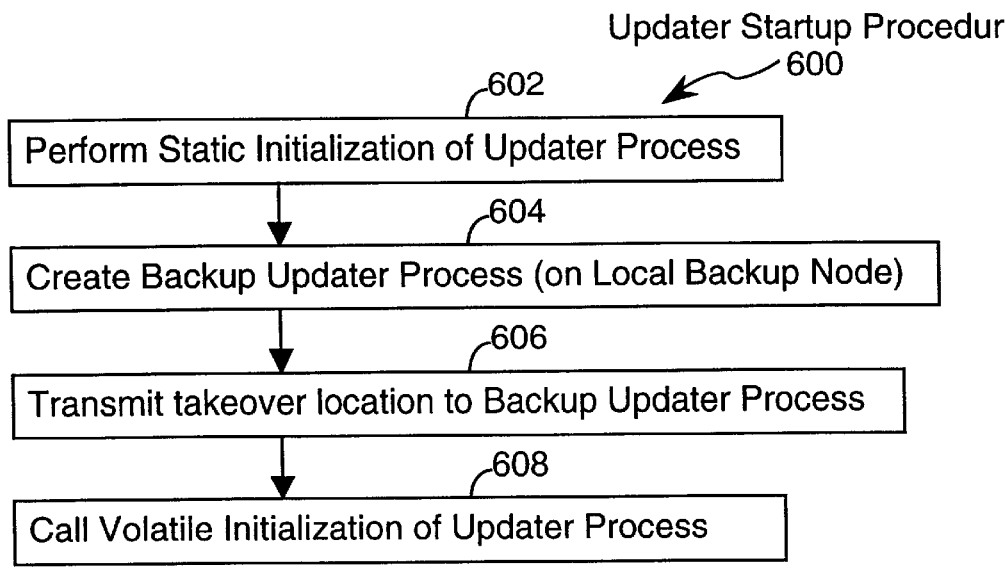
FIGS. 10A, 10B, 10C, 10D and 10E are flowcharts of procedures executed by the Updater processes in a preferred embodiment of the present invention.

Referring to FIG. 10A, the Updater Startup Procedure 600 is called whenever any Updater process 134 is started. The Updater Startup procedure begins by performing a "static initialization" of the Updater process (602), which means that all static data structures (such as a map of primary volumes to backup volumes) used by the Updater process are allocated and initialized. The startup procedure then creates a backup process (604). Then a checkpoint operation is performed in which a takeover location is transmitted to the backup Updater process (606). The takeover location is, in essence a program address, and in the preferred embodiment the takeover location is the program location at which execution of the Updater Volatile Initialization procedure 610 begins. Finally, the Updater Startup procedure calls (608) the Updater Volatile Initialization procedure 610.

Figure 10B:
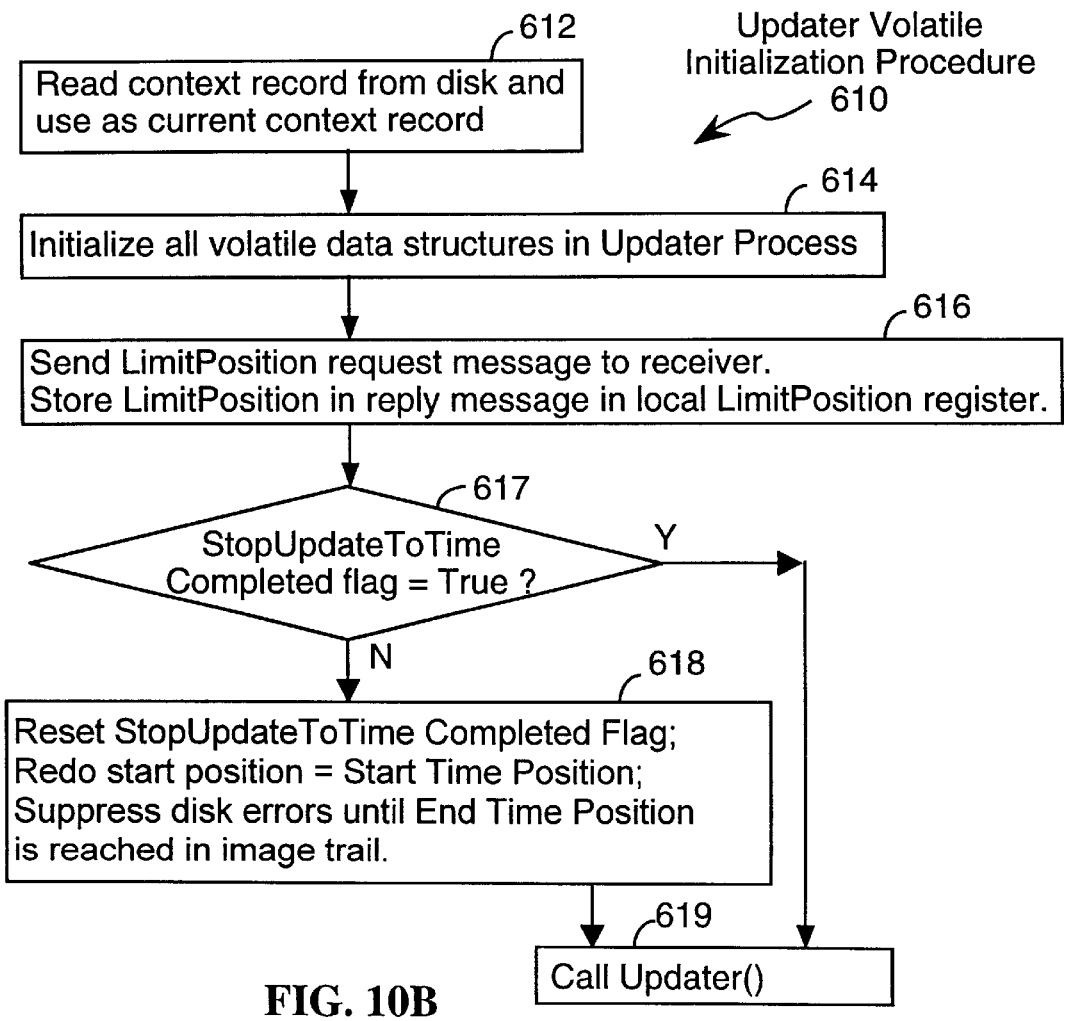

Referring to FIG. 10B, the Updater Volatile Initialization procedure 610 is called during startup by the Updater Startup procedure 600. The Updater Volatile Initialization procedure begins by reading the last stored Updater context record from disk and using it as the Updater's current context record in volatile memory (612). Then the Updater Volatile Initialization procedure allocates and initializes all volatile data structures (614) used by the Updater process, including the scratchpad 579. Then the Updater Volatile Initialization sends a LimitPosition request message to the Receiver, and stores the LimitPosition value in the resulting reply message in its local LimitPosition register 578 (616).

If the StopUpdateToTime Completed flag in the Updater context record is set (617), that flag is reset, the Redo restart position is set to the Start Time Position in the Updater context record, and disk errors are suppressed until the Updater reaches the End Time Position in the Updater's image trail (618).

Finally, the Volatile Initialization procedure calls (619) the main Updater procedure 620.

Updater Redo Pass

The Updaters have two types of operations: a redo pass and an undo pass. The redo pass is the normal mode of operation, in which update and backout audit is applied to a backup volume. The undo pass is used for removing all database changes caused by incomplete transactions. The redo pass (i.e., normal operation) will be explained first.

While redoing database update and backout operations on a backup volume, the Main Updater procedure 620 executes transactions that are distinct from the transactions performed by the primary system. In particular, the Updater treats all the operations it performs during a set period of time as a transaction. A timer is set at the beginning of the each Updater transaction. When the timer expires or "pops," the Updater transaction commits, which causes all the updates to the backup volume made during the transaction to be made permanent.

The database changes made by the Updaters to the backup database are performed in the same TMF transaction processing environment as transactions on the primary system. Thus, all database changes made by an Updater are reflected in audit records generated by the TMF system on the backup database. Also, whenever an Updater performs a redo on an audit record, it replaces the transaction ID in the audit record with the transaction ID for the Updater transaction so that the disk process that performs the database update can apply conventional commit/abort logic to the Updater transactions.

Referring to FIGS. 10C–10F, the Main Updater procedure 620 includes a subprocedure 630 for saving the Updater's context record. This subprocedure is called (A) whenever a predefined amount of time has elapsed since the current Updater transaction was started, and (B) at various other times such as when operation of the Updater is being stopped. In a preferred embodiment, the transaction Updater timer expires or pops once every five minutes.

The first step (632) of the Updater Context Save procedure 630 is to commit the current Updater transaction. This makes permanent all the database changes to the backup database made during the current Updater transaction. Then the procedure stores the current image trail position in the Redo Restart Position in the Updater's context record if the Updater is performing a Redo Pass. If the Updater is performing an Undo Pass, it stores the current image trail position in the Undo Restart Position in the Updater's context record (633) The Updater context record 570 is then durably stored to disk (634) using a "wait until complete" write operation so as to ensure that the context record is durably saved before any further operations can be performed by the Updater. Also, the Updater sends a purge request to the Purger process if at least a predefined amount of time (e.g., 5 minutes) has elapsed since the last such request was sent (635). The purge request includes the SysTxList from the image trail file currently being processed by the Updater, and requests the Purger to purge image trial files no longer needed by the Updater.

Figure 10C:
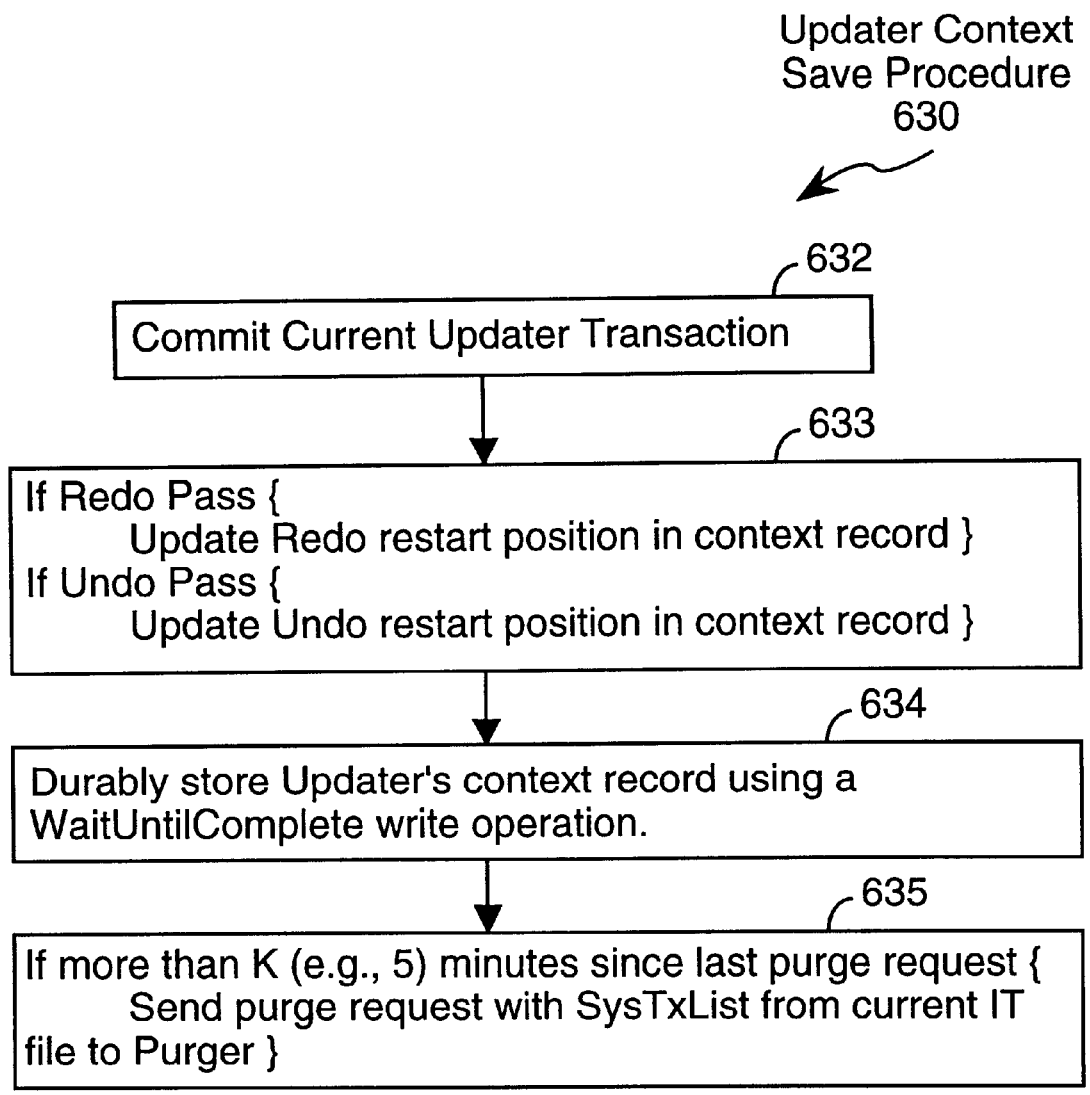
Figure 10D:
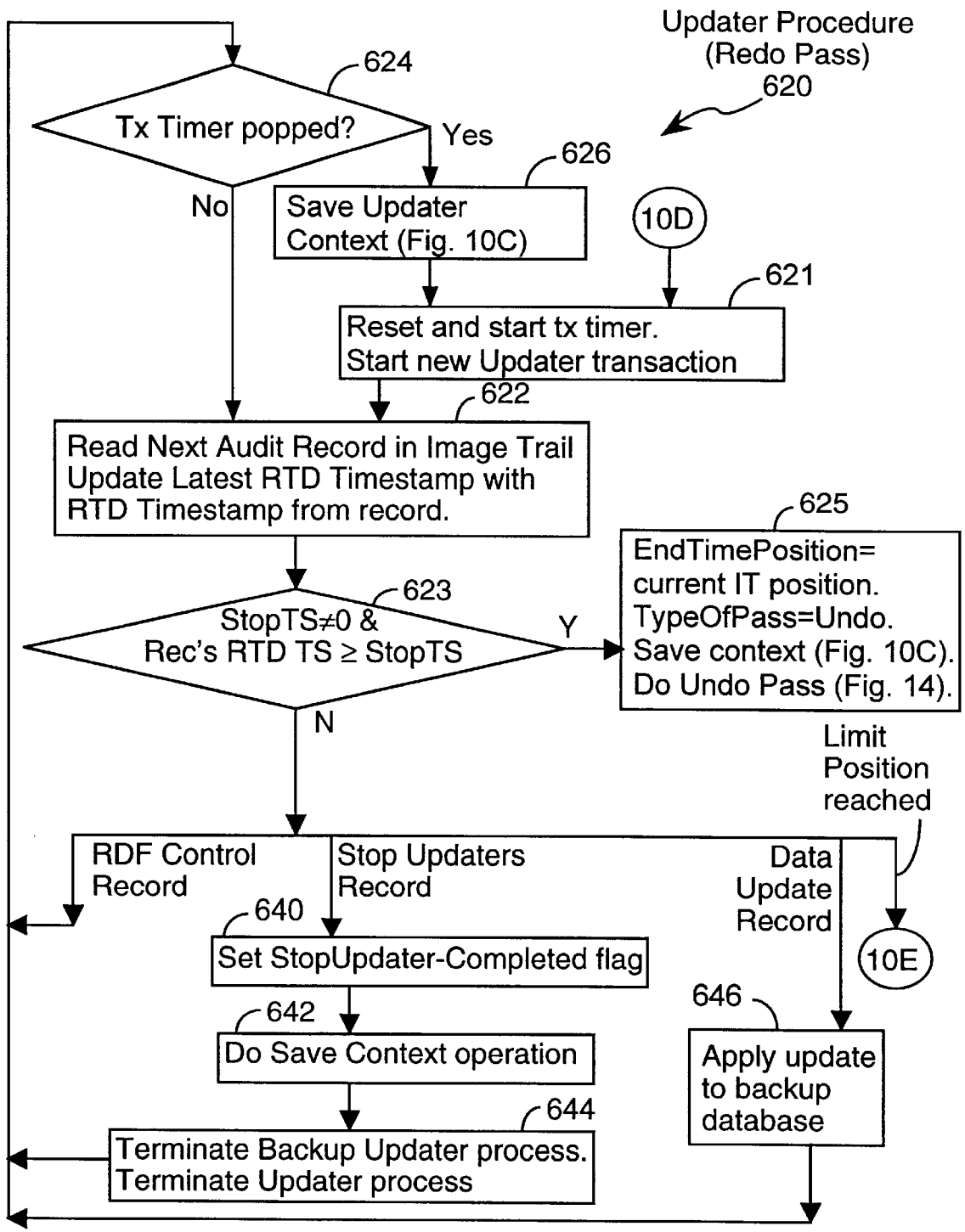
Figure 10E:
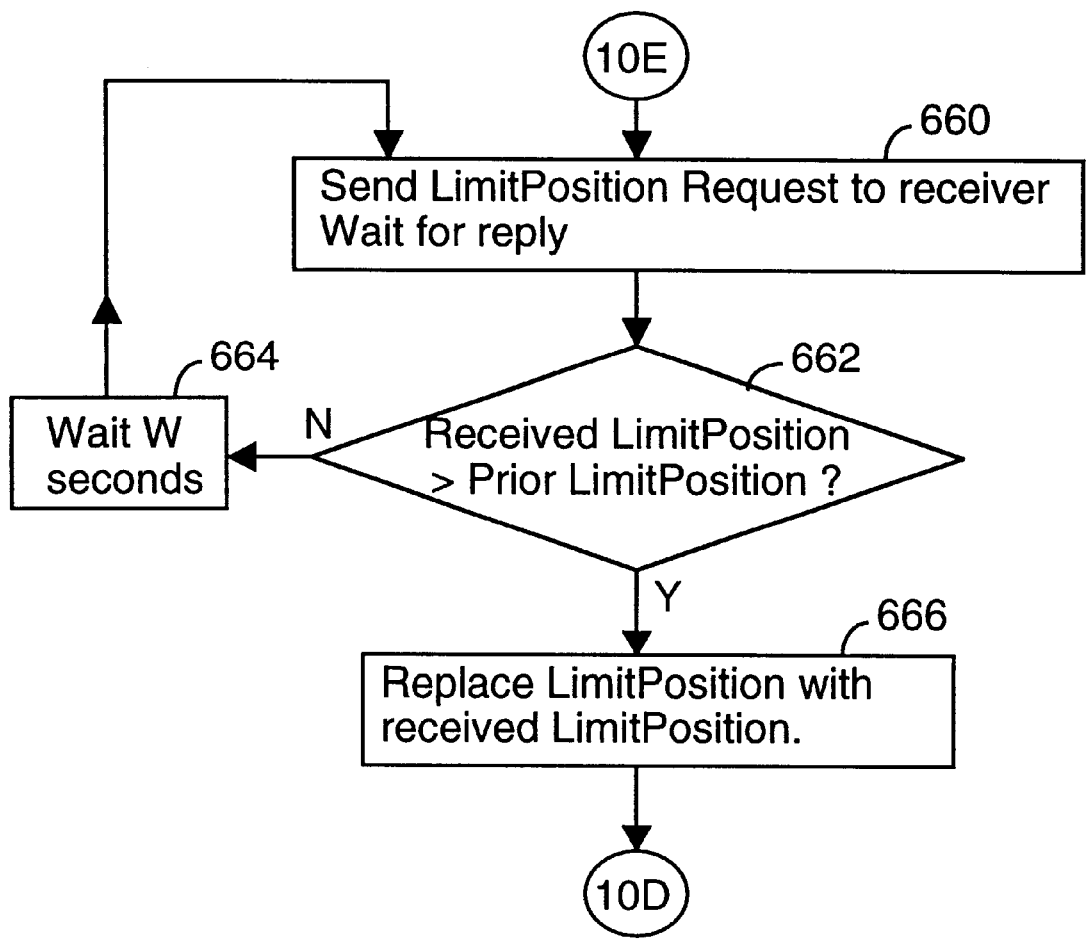

Referring to FIGS. 10D and 10E, the primary job of the Main Updater procedure 620 is to process audit image records in its image trail. When the Main Updater procedure first starts performing a Redo operation, it resets and starts the Updater's transaction timer, and starts a new Updater transaction (621). The transaction ID for the Updater transaction is checkpointed to the backup Updater process. If the primary Updater fails, the backup Updater uses the transaction ID to determine when the disk process has finished aborting the Updater transaction that was last being performed by the primary Updater process. Then, when the disk process finishes backing out all database changes made by that Updater transaction, the backup Updater process resumes processing audit records in the image trail at the Redo restart position (or the Undo restart position in the event of an Undo Pass).

At step 622 it reads the next audit image record, if any, in the image trail, and updates its locally stored "latest RTD Timestamp" 577 value with the RTD timestamp from the audit image record. If the Stop Timestamp value 579B is not zero, indicating that the Updater is performing a Stop Updaters at Timestamp operation, and the RTD timestamp in the audit image record is equal to or greater than the Stop Timestamp (623), the Updater procedure performs a set of steps (625) for stopping the Updater. In particular:

- the End Time Position is set to the current image trail position;
- the TypeOfPass field (579C, FIG. 9) in the Updater's context record is set to Undo;
- the Updater's context is saved (see FIG. 10C); and
- the Updater performs the Updater Undo Pass (described below with reference to FIGS. 14A and 14B).

If the Stop Timestamp value is zero or the current record's RTD timestamp is less than the Stop Timestamp (623-N), then the Main Updater procedure continues with normal processing of the image trail record read at step 622.

If the audit record just read is an "RDF Control" record, no further processing of that record is required, and processing resumes with next audit record (622).

If the audit record just read is a "Stop Updaters" record, the StopUpdaterCompleted flag 574 in the Updater context record 570 is set to True (640) and the Updater context save procedure 620 is called (642). The StopUpdaterCompleted flag 574 is read by the Monitor process on the next Start RDF or Start Update operation to ensure that all Updaters have stopped and that all have processed their image trails through the StopUpdaters record (as opposed to stopping due to a failure). Then the Updater's backup process is terminated and the Updater process itself terminates (644). The Updater process will start up again after the operator of the RDF system performs on the remote backup system the DDL operation that created the Stop Updaters audit record and then enters either the "Start Update" or "Takeover" command.

If the audit record just read is an update or backout record, a redo of the update or backout operation noted in the audit record is initiated against the backup database file (646).

When the attempt to read a next audit record (622) encounters an audit record at or beyond the LimitPosition value in LimitPosition register 578, a LimitPosition request message is sent to the Receiver (660) to determine whether the LimitPosition for the Updater has been advanced. When a reply message is received, the LimitPosition value in the received message is compared with the locally stored LimitPosition value (662). If the received LimitPosition is not larger than the previously stored LimitPosition value, the Updater 134 cannot process any further audit image records. As a result, the Updater waits for W seconds (664), where W is preferably a value between 1 and 10 and is typically set to 10, and then sends another LimitPosition request message to the Receiver (660). This continues until a LimitPosition value larger than the current LimitPosition is received from the Receiver. At that point the locally stored LimitPosition value in LimitPosition register 578 is replaced with the LimitPosition value in the received reply message (666), and then processing of audit image records resumes at step 622.

RDF Takeover Procedure

Figure 11:
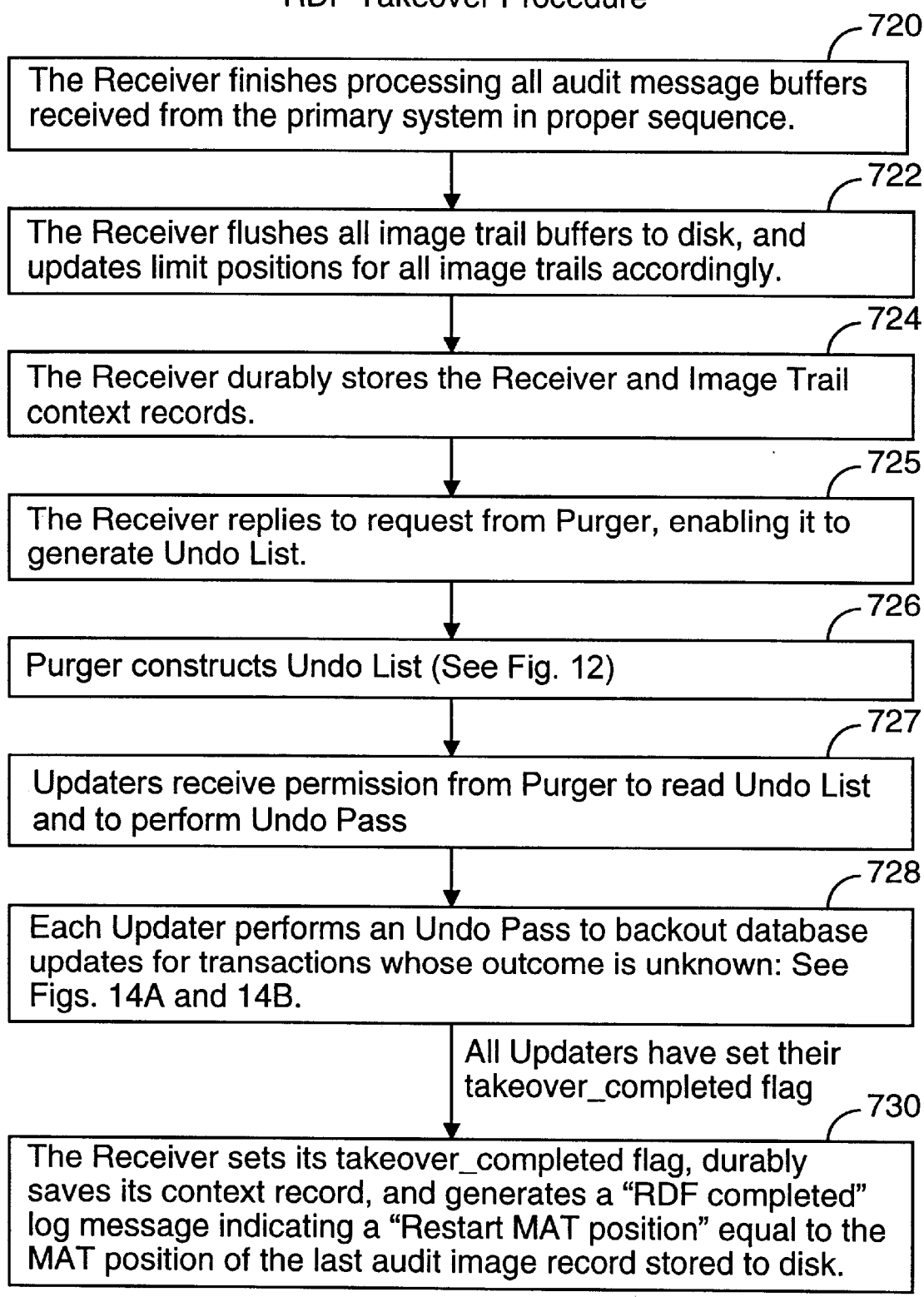
FIG. 11 depicts a flow chart of actions performed by a backup system when performing an RDF takeover, so as to prepare the backup system to take over and operate as the primary system.

Referring to FIG. 11, the RDF Takeover procedure begins when an operator of the system sets the takeover mode flags (399A, FIG. 7A, and 579A FIG. 9) in the Receiver, Updater and Purger processes. The RDF Takeover procedure is prevented from being executed if the primary system is still operating. Thus, when the RDF Takeover procedure is executed, there are no longer any message buffers of audit image records being received by the Receiver from the Extractor.

In response to the Takeover notification, the Receiver completes all processing of previously received message buffers (720), flushes all the image trail buffers to disk, updating the limit positions for all the image trails accordingly (722), and durably stores the Receiver and Image Trail context records to disk (724).

The Purger responds to the Takeover notification by sending the Receiver a request for permission to generate an Undo List file. Similarly, when the Updaters finish processing all audit records in their respective image trails, they respond to the Takeover notification by sending the Purger a request for permission to perform an Undo Pass.

After completing steps 720, 722, 724, the Receiver replies to the Purger request, enabling it to generate the Undo List (725). The Purger generates the Undo List file (726), and then grants permission to the Updaters to perform an Undo Pass (727). The Updaters respond by reversing the affects of all update audit for the transactions listed in the Undo List. Upon completing the Undo Pass, each Updater sets its Takeover_Completed flag (574C, FIG. 9), durably stores its context record and terminates (728). The Updater Undo Pass is discussed in more detail below with reference to FIGS. 14A and 14B.

When all the Updaters have shut down, the Receiver reads the Updater context records. If every Updater has set its Takeover_Completed flag, then the Receiver sets its Takeover_Completed flag (391A, FIG. 7A), durably stores its context record, and generates a "RDF Takeover completed" log message (stored in the log file for the RDF system) indicating the MAT position of the last audit image record stored to disk (730).

However, if any of the Updaters fail before setting their Takeover_Completed flag, the Receiver will detect this and will generate a corresponding RDF takeover failure log message, in which case the system's operator will need to re-execute the RDF takeover command.

Generating the Undo List

It is noted here that the Undo List is generated not only during a takeover operation, but also when a Stop Updaters at Timestamp operation is performed.

Figure 12:
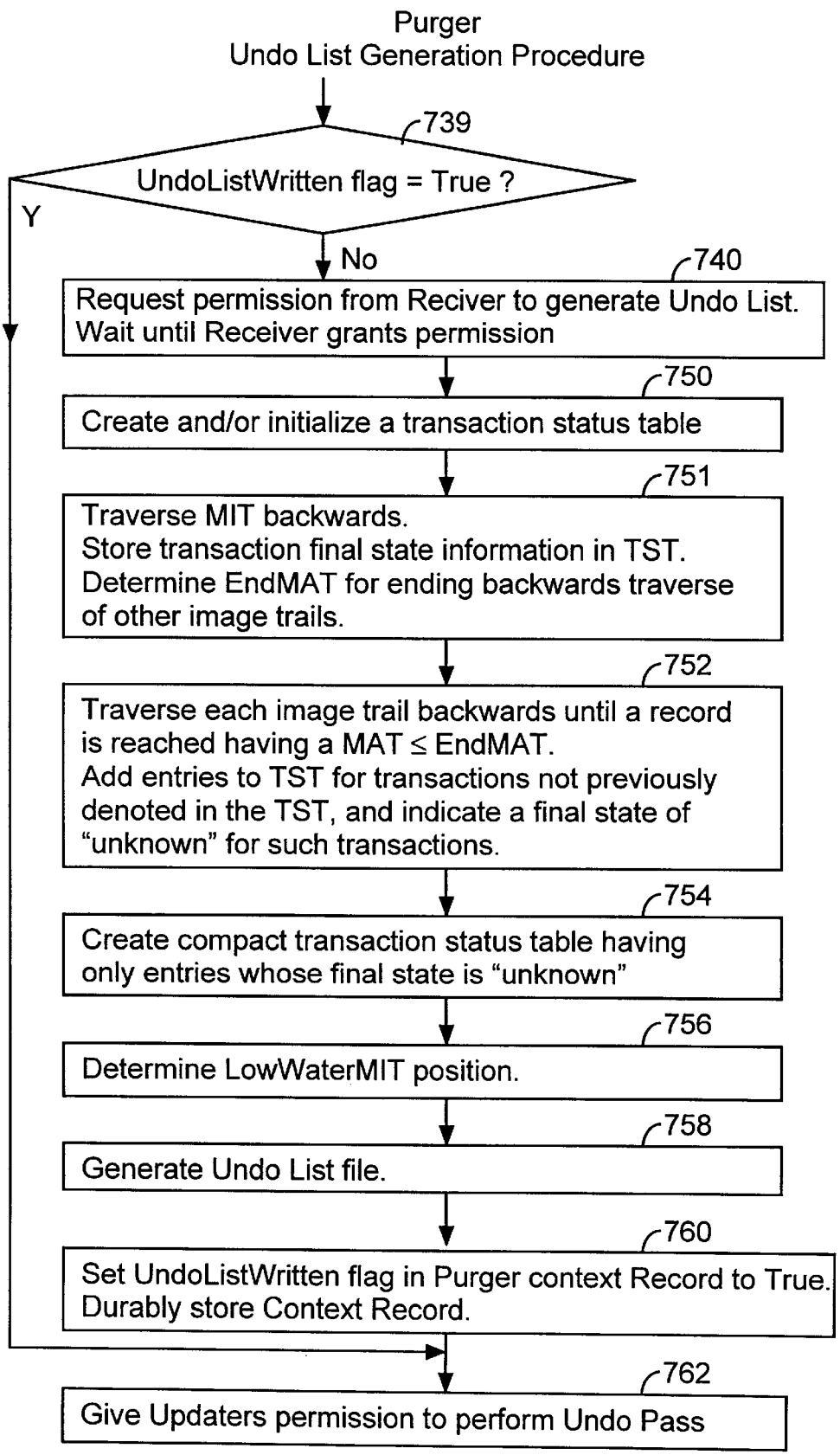
FIG. 12 depicts a flow chart of the procedure for generating an Undo List of transactions whose final state is unknown.

Referring to FIG. 12, the Undo List can be created by either the Receiver or by another process. For the purposes of this explanation, it will be assumed that the Undo List is generated by a process herein called the Purger. However, in other embodiments the Undo List could be generated by the Receiver or another process. Further, in some embodiments, one process, such as the Receiver, could generate the Undo List during a takeover operation, while another process such as the Purger could generate the Undo List during a Stop Updaters at Timestamp operation.

In the preferred embodiment, the Purger requests permission from the Receiver to generate the Undo List, and then waits until the Receiver grants that permission (740). The Receiver grants the Purger permission only after it is sure that all information needed by the Purger has been durably stored.

Figure 13:
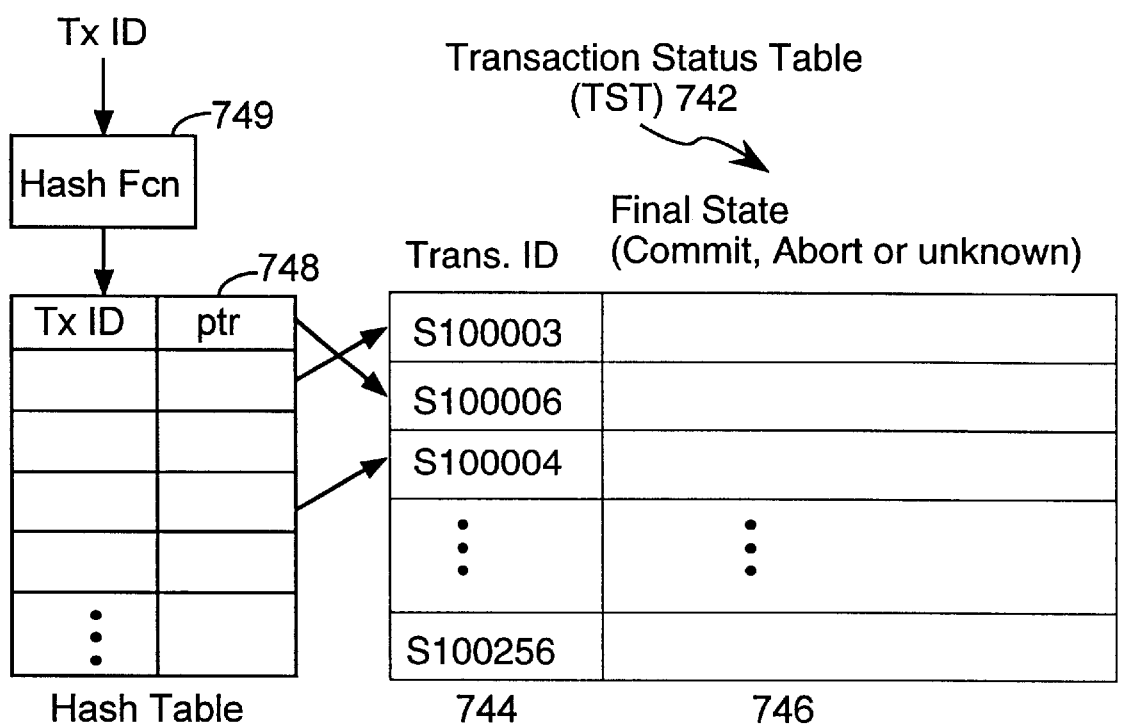
FIG. 13 depicts a transaction status table used in a preferred embodiment.

The Purger begins by creating a transaction status table (TST) that is accessed using a hash table (750). Referring to FIG. 13, the TST 742 stores, for each transaction for which information is stored in the table, the transaction ID 744, and the final state 746 of the transaction, if it is known. A hash table 748 is used to locate items in the TST 742. In particular, the transaction identifier (TxID) of a transaction is converted into a hash table index by a hash function 749, and then an item in the hash table either at the index position or after the index position contains a pointer to the TST entry for that transaction. The TST 742 is preferably filed with entries in sequential order, starting either at the top or bottom of the TST.

Traverse MIT Backwards and Fill In Transaction Status Table

Next, the Purger traverses Master Image Trail (MIT) backwards (751). If a takeover operation is being performed, the Purger reads the MIT backwards from its end of file. If a Stop Updaters at Timestamp operation is being performed, the Purger finds the starting point for the backward pass by reading the MIT backwards until it reads an audit record whose timestamp is less than the Stop Timestamp. Then it starts the backward pass at that record.

In either case, the Purger continues reading the MIT backwards until it has read backward through one complete TMP control interval. Generally, this means that it reads backwards until it has read two TMP control point records. The MAT position of the TMP control point record that completes the backward pass is stored as the "EndMAT" position.

For each transaction state record in the MIT that is read during this backward pass, the transaction state is stored in the transaction table as the final state for that transaction only if no information about the transaction has been previously stored in the transaction table (751). In other words, only the last transaction state value in the MIT is stored in the transaction table. Also, if the last known state for a transaction is not commit or abort, it is denoted as "unknown" in the table. Since the state of every active transaction must be represented by a transaction state record during each TMP control interval, except for transactions that started during that TMP control interval, the backward pass will identify all transactions whose state is known at the point in time in the primary system represented by the last of the audit records received by the backup system.

Next, the Purger traverses each of the other Image Trails backwards from its end until it reaches a record whose MAT is less than the EndMAT position. For each image trail record, it is determined if the corresponding transaction is represented in the transaction status table. If so, nothing further is done for that record. Otherwise, a new entry is made in the transaction status table, and the status of the corresponding transaction is denoted in the table as "unknown" (752). When all the image trail files have been processed in this way, the transaction status table will contain entries for all transactions for which (A) there is at least one audit record in the image trail files and (B) the outcome of the transaction (commit or abort) is unknown. The Purger next constructs a compact list of all the transactions in the transaction status table whose status is denoted as "unknown" (754). This is preferably done by storing these entries at the top of the transaction status table, and the resulting table of transactions is herein called the "compressed transaction status table." The hash table for the transaction status table is rebuilt to include only entries for transactions whose status is denoted as unknown and to point to the remaining transactions in their new locations.

Next, the Purger determines the LowWaterMIT position (756). To do this, the Purger reads the MIT backwards until it finds an TMP control interval in which there are no transaction state records for any transactions in the compressed transaction status table. The LowWaterMIT is set to the MIT position of the TMP control point record at the beginning of the first TMP control interval found that meets this requirement. Alternately, the MAT position for this TMP control point record could be retained.

The Purger generates an Undo file, herein called the Undo List or the Undo List file (758), that includes:
the LowWaterMIT;
a parameter indicating the number of transactions included in the Undo List (which is the same as the number of transactions denoted in the compressed transaction status table); and
a list of the transaction IDs of all the transactions in the compressed status table.

In one embodiment, the Undo List may be stored as a set of blocks, each of which contains up to N (e.g., 510) transaction IDs, as well as the LowWaterMIT and an indicator of the number of transaction IDs listed in that block.

When the Purger has finished generating the Undo List, it sets an Undo List Written flag in its context record to True, and durably stores its context record (760). Also, it responds to pending requests from the Updaters to grant them permission to perform an Undo Pass.

If the Purger fails and restarts in Takeover mode or Stop Updaters at Timestamp mode, and the UndoListWritten flag is set to False, it purges the Undo List file (if one exists) and starts building the Undo List from scratch.

Updater Undo Pass

Figure 14A:
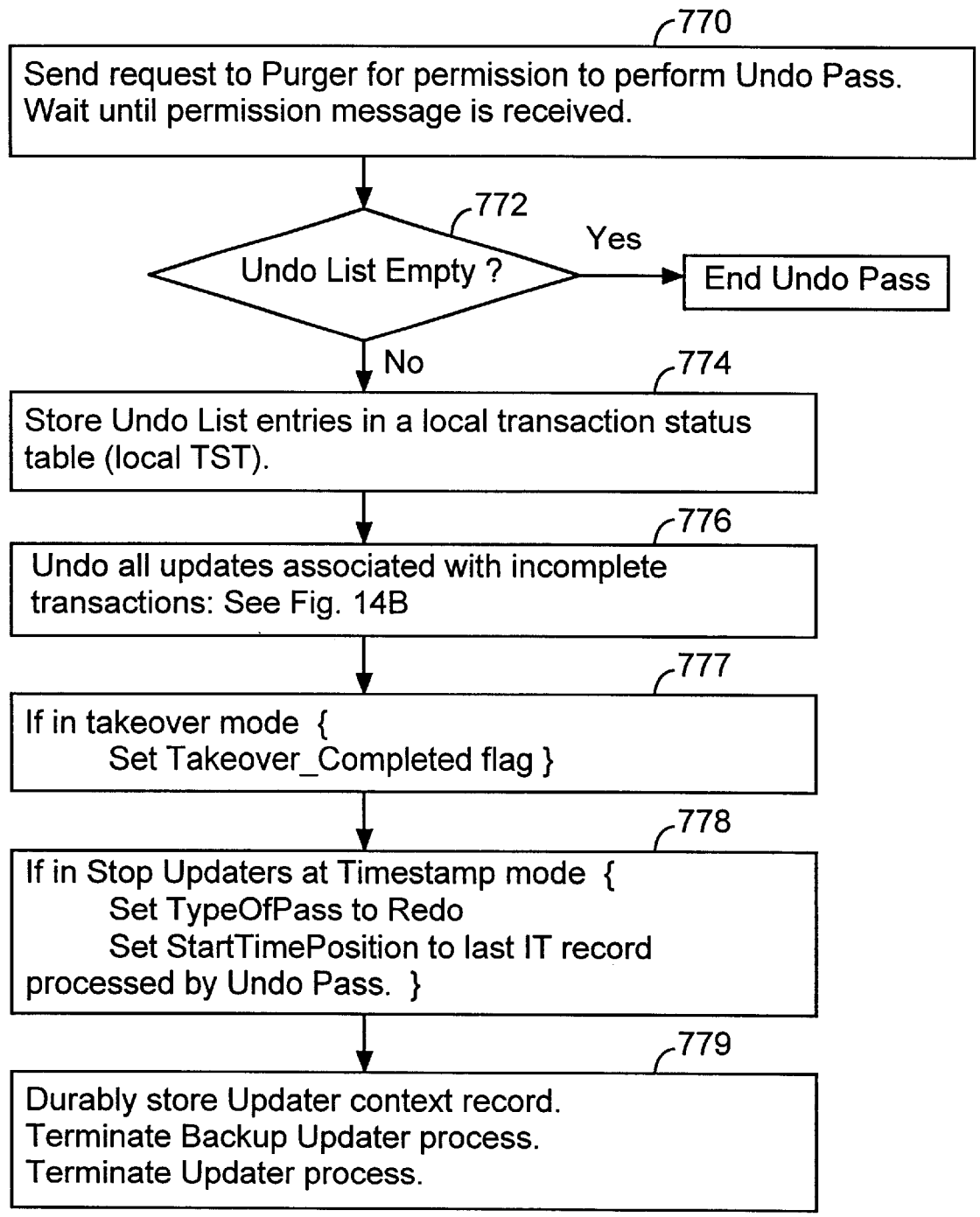
FIGS. 14A and 14B depicts a flow chart of the Updater Undo procedure for backing out updates for incomplete transactions.
Figure 14B:
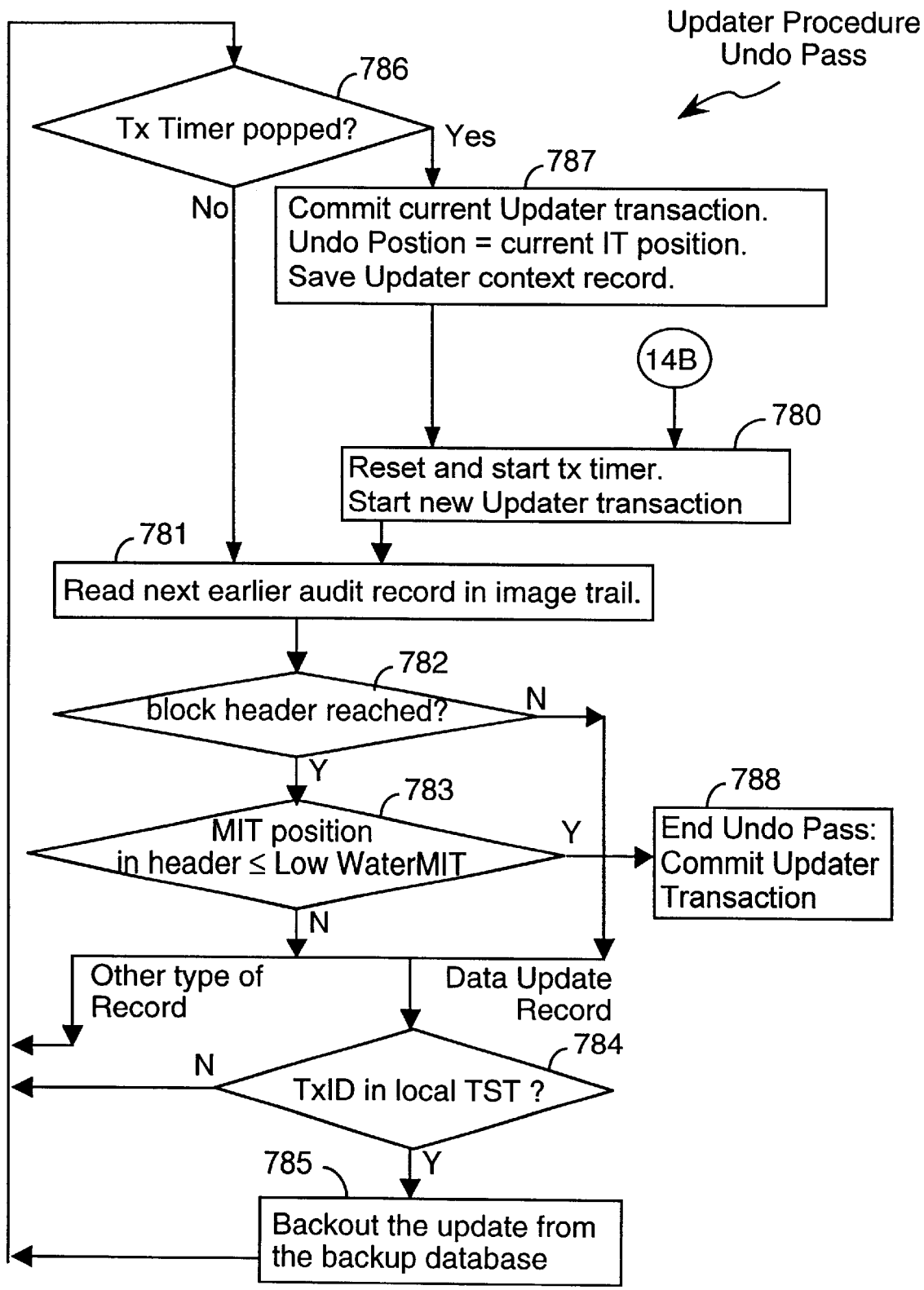

Referring to FIGS. 14A and 14B, in takeover mode, after each Updater finishes its Redo Pass, it requests permission from the Purger to perform an Undo Pass (770). The Purger responds to that request only after it completes generation of the Undo List.

Upon receiving such permission, the Updater checks to see if the Undo List is empty (772). If so, it stops and ends the Undo Pass. Otherwise, it stores (774) all entries in the Undo List in a local transaction status table (local TST), which may have essentially the same structure as the transaction status table shown in FIG. 13, except that the Final State column is not needed because all transactions listed in the table are assumed to be transactions whose final state is unknown.

Next, the Updater undoes all updates associated with incomplete transactions (776). This will be described in more detail below with reference to FIG. 14B. Next, if the backup system is takeover mode, the Updater sets its Takeover_Completed flag (777). If the backup system is in Stop Updaters at Timestamp mode, the Updater sets the TypeOfPass context record field to Redo, sets the StopUpdateToTime Completed flag to True, and sets the StartTimePosition field to point to the last image trail record processed by the Undo Pass (778). Then the Updater durably stores its context records (779), and exits by terminating the Updater process and the backup Updater process (779).

Referring to FIG. 14B, the Undo Pass starts at step 780, with the Updater starting a transaction timer (e.g., a 5 minute timer) and starting a new Updater transaction. Then the Updater reads its image audit trail file backwards (781), starting with the last record the Updater applied to the backup database, until it reads a block header (782) having a MIT indicated in its header that is less than or equal to the LowWaterMIT (783).

All complete records in the block having this MIT are processed, but no earlier blocks in the image trail are processed. For each audit record representing an update, the Updater checks the local TST (784). If the transaction ID for the transaction is not present in the local TST, the audit record is not further processed (784-No). On the other hand, if the transaction ID for the transaction is present in the local TST, the update represented by the audit record is undone (785), and a corresponding exception record is written to an exceptions log. As many undo operations as can be performed during each transaction timer period are performed as a single Updater transaction. When the transaction timer pops (786), the current Updater transaction is committed (787). In addition, the Updater saves its current image trail position in the Undo position field of its context record and durably saves its context record (787).

When the Updater finishes processing all the complete records in an image trail file block whose header indicates a MIT that is less than or equal to the LowWaterMIT (783), the current Updater transaction is committed and the Undo pass ends (788).

Detailed Explanation of Stop Updaters at Timestamp Procedure

If the primary system is in active use and the Updaters are active on a backup system, the data volumes on the backup system will not be in a completely consistent state because some transactions will be only partially stored to disk. Because the Updaters operate asynchronously with respect to each other, some Updaters may have already applied audit associated with some transactions, while other Updaters have not yet processed audit associated with that same set of transactions. While this "inconsistent state" problem is of no consequence for most casual database inquiries (e.g., a "browsing" or "read only" query about the number of seats available on a particular airplane flight), it is intolerable for tasks that require consistent or stable access, such as generating monthly reports and other important management data summaries that must be totally internally consistent.

The "Stop Updaters at Timestamp" feature of the present invention brings the backup database to a consistent state without affecting the primary system's operation in any way. Referring to step 623 and 625 of FIG. 10D, when the Stop Updaters at Timestamp feature is in use, the Updater automatically stops applying audit when it reaches an audit record whose timestamp is greater than or equal to the stop timestamp (StopTS). It also sets the EndTimePosition field in its context record to the current position in the image trail (i.e., the first record in the image trail not applied to the backup database), and sets the TypeOfPass field to Undo. Then it saves its context, which marks the end of the Redo Pass, and then performs an Undo Pass.

The Purger, while generating the Undo List, operates slightly differently in Stop Updaters at 25 Timestamp mode than in takeover mode. In particular, while traversing the MIT backwards (step 751, FIG. 12), each transaction whose final state record has a timestamp that is greater than (i.e., later than) the StopTS is assigned a final state of "unknown" in the transaction status table. This is done because as of the StopTS time, the final status of these transactions is unknown.

The Undo Pass of the Updaters has already been described in detail, above, with reference to FIGS. 14A and 14B. When an Undo Pass is performed in Stop Updaters at Timestamp mode, instead of takeover mode, the backwards pass starts at the last audit record applied to the backup database (which is the record before the EndTimePosition) instead of starting at the end of the image trail. Also, in Stop Updaters at Timestamp mode, at the end of the Undo Pass the Updater sets the TypeOfPass and EndTimePosition fields to prepare the Updater for starting at the proper position and in the proper mode when the system administrator restarts the Updaters.

More specifically, the first time the Updater reads an audit image record having an RTD Timestamp at or after the Stop Timestamp, the following set of actions are preformed:

the EndTimePosition in the Updater's context record is set to first unprocessed audit record in the image trail; and the TypeOfPass field in the Updater's context record is set to Undo.

Note that the Stop Updaters at Timestamp procedure only causes the Updaters to stop, while the Extractor and Receiver continue to process audit information. Also, the Updater saves information in its context record to guarantee that no image audit records will be missed by the Updaters as the result of a Stop Updaters at Timestamp operation. The Stop Updaters at Timestamp operation leaves the Updaters ready to start processing all audit image records not applied to the backup database before the Updaters shut down.

Receiver and Updater Restart

Whenever the Receiver process is restarted, such as after a system failure, and RDF shutdown or an RDF Takeover, the Receiver process is initialized. After a full RDF shutdown the Receiver process is always restarted before the Updaters are restarted.

Each time the Updaters in a backup system are restarted, such as after performing a Stop RDF, Stop Updaters at Timestamp, or an RDF Takeover, each Updater process is initialized and starts processing image trail records at the record indicated by the Redo Restart Position (571, FIG. 9) in the Updater's context record (790).

If the StopUpdateToTime Completed flag is set, then the Updater suppresses the generation of error messages associated with redoing updates that may have already been applied to the backup database until it reads an audit record whose MAT position is greater than the EndTimePosition, at which point the generation of such errors is enabled.

Purging Image Trail Files

Generally, an image trail file can be purged (i.e., permanently deleted) when it is absolutely certain that the file contains no audit records that will ever be needed again, even if there is a primary system failure, backup system failure, or both. More specifically, an image trail must not be purged if it contains an audit record for any transaction that would not be completely committed to storage on the backup system in the event of a system failure.

The purpose of the System Transaction List (SysTxList) shown in FIG. 7G, and stored in the header of each image trail file is to facilitate the process of determining which image trail files can be purged. This will now be explained in more detail.

Periodically, such as every 5 minutes, each Updater sends the Purger a "purge request" message that includes copy of the SysTxList at beginning of that image trial file that it is currently process (633, FIG. 10C).

Figure 15:
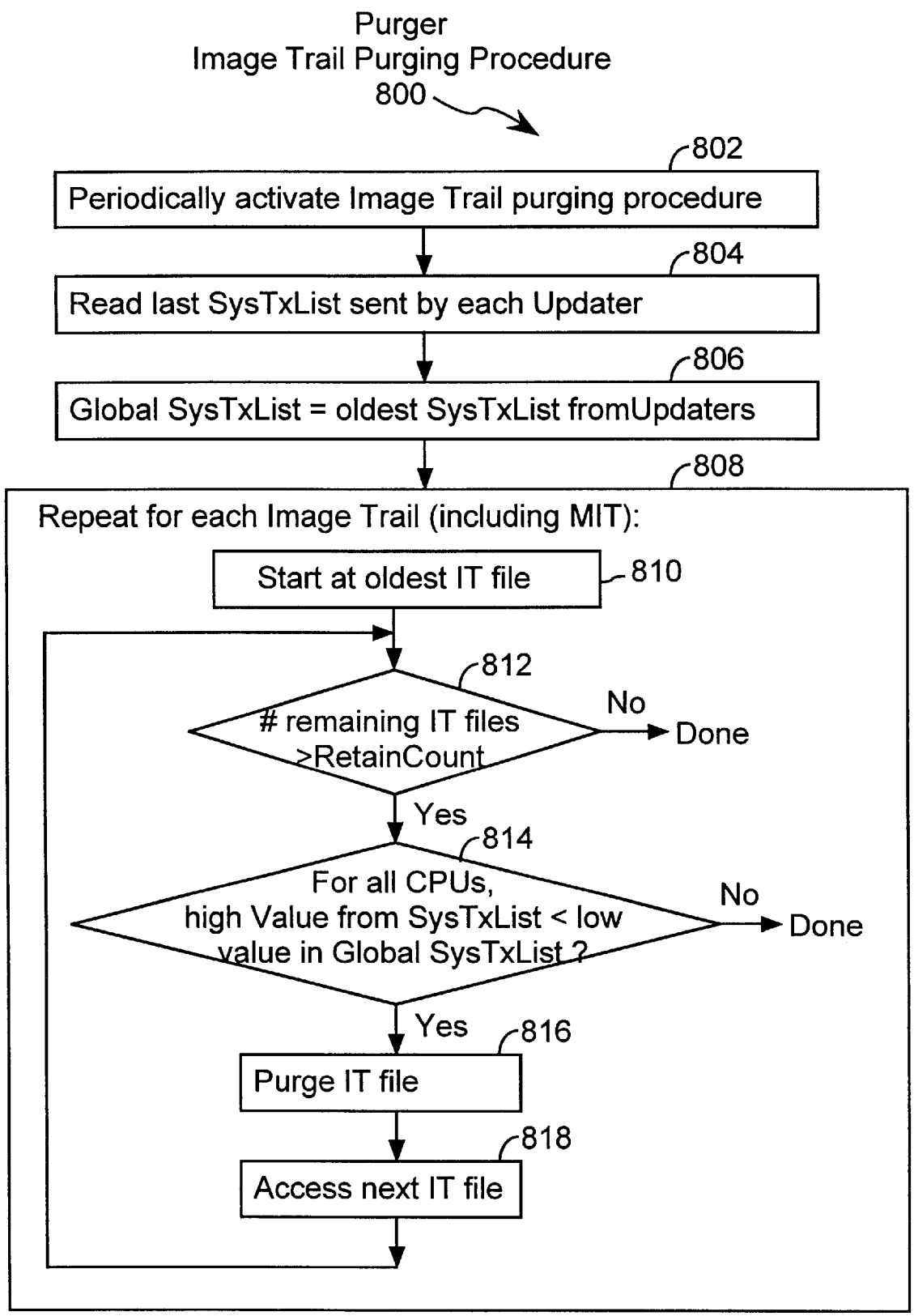
FIG. 15 depicts a flow chart of a procedure for periodically purging image trail files no longer needed by the backup systems.

Referring to FIG. 15, the image trail purging procedure (800) is activated periodically (802), such as once every hour. Alternately, the time between successive activations of the Purger may depend on the amount of audit information being received from the primary system. For instance, the Purger might be activated the earlier of (A) passage of N minutes, and (B) receipt of M message buffers from the primary system.

The Purger reads the last SysTxList sent by each Updater (804), selects the oldest one of those SysTxList's by determining which has the lowest transaction ID's and uses the selected SysTxList as a Global SysTxList (806). The Global SysTxList may have the same structure as the SysTxList shown in FIG. 7G, or the high transaction ID field may be omitted, because the high Transaction ID for each CPU is not used.

Next, the Purger reads each image trail, starting with the oldest file (810), and purges all the files for that image trail that meet predefined purge criteria (808). The Purger is preferably configured to leave a predefined minimum number (RetainCount) of files in each image trail. In other words, even if an image trail file would otherwise be eligible for purging, it is kept if there are RetainCount or fewer files left in the image trail (812). In a preferred embodiment, the RetainCount cannot be set to less than two.

The Purger determines whether, for all CPUs, the high transaction ID value in the SysTxList in the image trail file header is less than the low transaction ID value in Global SysTxList (814). If so, and the image trail contains at least the RetainCount number of files, the file is purged (816), and then the next file in the image trail is processed (818). If for any CPU the high transaction ID value in the SysTxList in the image trail file header is higher than or equal to the corresponding low transaction ID in the Global SysTxList, the image trail file may contain audit records that would be needed in a Takeover or Stop Updaters at Timestamp operation, and therefore that image trail file cannot be deleted and processing of that image trail is complete.

Alternately, and this would take much more computational resources, at step 814 the audit records in the image trail file are inspected to see any audit records in the file have a transaction ID that is less than the low transaction ID specified in the Global SysTxList for the corresponding primary system CPU. If the image trail file contains no such audit records, and the image trail contains at least the RetainCount number of files, the image trail file is deleted (816). Otherwise, the file is not deleted and processing of that image trail is complete.

Alternate Embodiments

The tasks performed by the Receiver, Updater, and Purger processes of the preferred embodiment can, in other embodiments, be performed by processes performing other tasks as well, or by a different set of processes.

The present invention can be implemented as a computer program product that includes a computer program mechanism embedded in a computer readable storage medium. For instance, the computer program product could contain the program modules for one or more of the Receiver, Updater and Purger processes. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of operating a backup system so as to replicate database updates performed on a primary system, the method comprising:

receiving a stream of audit records from the primary system, the audit records including audit update records indicating database updates generated by transactions executing on the primary system;

storing the audit update records in one or more image trails, and storing each image trail in a sequence of image trail files;

storing in each image trail file a transaction table representing a range of transaction identifiers for transactions potentially pending in the primary system at the time that the first audit record in the image trail file was generated by the primary system;

for each image trail, accessing and processing the audit records in the sequence of image trail files for that image trail; and periodically executing a file purge procedure for purging image trail files no longer needed, including:

identifying an oldest transaction table from among a set of transaction tables each of which comprises the transaction table in the last image trail file accessed for each of the image trails;

accessing an image trail file for one of the image trails;

comparing a first set of newest transaction identifiers in the transaction table in the accessed image trail file with a second set of oldest transaction identifiers in the identified oldest transaction table, and conditionally purging the accessed image trail file when all of the transaction identifiers in the first set are older than corresponding transaction identifiers in the second set.

2. A method of operating a backup system so as to replicate database updates performed on a primary system, the method comprising:

receiving a stream of audit records from the primary system, the audit records including audit update records indicating database updates generated by transactions executing on the primary system, transaction state records and time interval control records, at least a subset of the transaction state records indicating a commit/abort outcome for a specified transaction;

each audit update record and transaction state record including a transaction identifier that identifies a corresponding transaction on the primary system;

storing the audit update records in one or more image trails;

inspecting the received transaction state records in a predefined chronological order and generating a current transaction table representing a range of transaction identifiers for transactions for which there is at least one transaction state record between successive ones of the time interval control records in the stream of audit records;

saving the current transaction table as a previous transaction table and generating a new current transaction table whenever a time interval control record is received;

storing each of the image trails as a sequence of image trail files, including generating a new image trail file each time a previous image trail file reaches a predefined state, and storing in each new image trail file a copy of the previous transaction table at the time that the new image trail file is generated;

for each image trail, accessing and processing the audit records in the sequence of image trail files for that image trail; and periodically executing a file purge procedure for purging image trail files no longer needed, including:
identifying an oldest transaction table copy from among a set of transaction table copies that comprises the transaction table copy in the last image trail file accessed for each of the image trails;
accessing an image trail file for one of the image trails;
comparing a first set of newest transaction identifiers in the transaction table copy in the accessed image trail file with a second set of oldest transaction identifiers in the identified oldest transaction table copy, and conditionally purging the accessed image trail file when all of the transaction identifiers in the first set are older than corresponding transaction identifiers in the second set.

3. The method of claim 2, wherein the step of periodically executing a file purge procedure includes:
storing in a global transaction table information including the second set of oldest transaction identifiers in the identified oldest transaction table copy;
for each image trail for which there are more than a predefined (RetainCount) number of image trail files that have not been purged, performing the steps of accessing an image trail file, comparing the first and second sets of transaction identifiers, and conditionally purging the accessed image trail file.

4. The method of claim 3, wherein the step of periodically executing a file purge procedure includes:
for each image trail for which there are more than a predefined (RetainCount) number of image trail files that have not been purged,
accessing the image trail files for the image trail in chronological order, excluding the RetainCount most recent image trail files;
for each accessed image trail file comparing the first and second sets of transaction identifiers; and
conditionally purging the accessed image trail file when all of the transaction identifiers in the first set are older than corresponding transaction identifiers in the second set.

5. The method of claim 4, wherein the step of periodically executing a file purge procedure includes:
for each image trail for which there are more than a predefined (RetainCount) number of image trail files that have not been purged,
accessing the image trail files for the image trail in chronological order, excluding the RetainCount most recent image trail files;
for each accessed image trail file comparing the first and second sets of transaction identifiers;
conditionally purging the accessed image trail file when all of the transaction identifiers in the first set are older than corresponding transaction identifiers in the second set; and
stopping the accessing of the image trail files for the image trail when any of the transaction identifiers in the first set are not older than corresponding transaction identifiers in the second set.

6. A computer program product for use in conjunction with a backup computer system so as to replicate database updates performed on a primary system, the computer program product comprising a computer readable storage medium and a computer program mechanism embedded therein, the computer program mechanism comprising:
a Receiver Module that receives and stores in one or more image trails a stream of audit records received from the primary system, the audit records including audit update records indicating database updates generated by transactions executing on the primary system, and stores each image trail in a sequence of image trail files;
the Receiver Module storing in each image trail file a transaction table representing a range of transaction identifiers for transactions potentially pending in the primary system at the time that the first audit record in the image trail file was generated by the primary system;
at least one Updater Module that sequentially applies to a backup database the database updates indicated by the audit update records, in the order the audit update records are stored in the image trails; and
a file purge procedure for purging image trail files no longer needed, the file purge procedure including instructions for:
identifying an oldest transaction table from among a set of transaction tables that comprises the transaction table in the last image trail file accessed for each of the image trails;
accessing an image trail file for one of the image trails;
comparing a first set of newest transaction identifiers in the transaction table in the accessed image trail file with a second set of oldest transaction identifiers in the identified oldest transaction table, and conditionally purging the accessed image trail file when all of the transaction identifiers in the first set are older than corresponding transaction identifiers in the second set.

7. A method of operating a backup system so as to replicate database updates performed on a primary system, the method comprising:
a Receiver Module that receives and stores in one or more image trails a stream of audit records received from the primary system, the audit records including audit update records indicating database updates generated by transactions executing on the primary system, transaction state records and time interval control records, at least a subset of the transaction state records indicating a commit/abort outcome for a specified transaction;
each audit update record and transaction state record including a transaction identifier that identifies a corresponding transaction on the primary system;
the Receiver Module storing the audit update records in one or more image trails;
the Receiver Module includes instructions for:
inspecting the received transaction state records in a predefined chronological order and generating a current transaction table representing a range of transaction identifiers for transactions for which there is at least one transaction state record between successive ones of the time interval control records in the stream of audit records;

saving the current transaction table as a previous transaction table and generating a new current transaction table whenever a time interval control record is received;

storing each of the image trails as a sequence of image trail files, including generating a new image trail file each time a previous image trail file reaches a predefined state, and storing in each new image trail file a copy of the previous transaction table at the time that the new image trail file is generated;

at least one Updater Module that sequentially applies to a backup database the database updates indicated by the audit update records, in the order the audit update records are stored in the image trails; and a file purge procedure for purging image trail files no longer needed, the file purge procedure including instructions for:

identifying an oldest transaction table copy from among a set of transaction table copies, each of which comprises the transaction table copy in the last image trail file accessed for each of the image trails;

accessing an image trail file for one of the image trails;

comparing a first set of newest transaction identifiers in the transaction table copy in the accessed image trail file with a second set of oldest transaction identifiers in the identified oldest transaction table copy, and conditionally purging the accessed image trail file when all of the transaction identifiers in the first set are older than corresponding transaction identifiers in the second set.

8. The computer program product of claim 7, wherein the file purge procedure includes instructions for:

storing in a global transaction table information including the second set of oldest transaction identifiers in the identified oldest transaction table copy;

for each image trail for which there are more than a predefined (RetainCount) number of image trail files that have not been purged, performing the steps of accessing an image trail file, comparing the first and second sets of transaction identifiers, and conditionally purging the accessed image trail file.

9. The computer program product of claim 8, wherein the file purge procedure includes instructions for:

for each image trail for which there are more than a predefined (RetainCount) number of image trail files that have not been purged, accessing the image trail files for the image trail in chronological order, excluding the RetainCount most recent image trail files;

for each accessed image trail file comparing the first and second sets of transaction identifiers; and conditionally purging the accessed image trail file when all of the transaction identifiers in the first set are older than corresponding transaction identifiers in the second set.

10. The computer program product of claim 9, wherein the file purge procedure includes instructions for:

for each image trail for which there are more than a predefined (RetainCount) number of image trail files that have not been purged, accessing the image trail files for the image trail in chronological order, excluding the RetainCount most recent image trail files;

for each accessed image trail file comparing the first and second sets of transaction identifiers;

conditionally purging the accessed image trail file when all of the transaction identifiers in the first set are older than corresponding transaction identifiers in the second set; and stopping the accessing of the image trail files for the image trail when any of the transaction identifiers in the first set are not older than corresponding transaction identifiers in the second set.

11. A backup computer system for replicating database updates performed on a primary system, comprising:

a backup database;

a Receiver Module for processing a stream of audit records received from the primary system, the audit records including audit update records indicating database updates generated by transactions executing on the primary system, and stores each image trail in a sequence of image trail files;

the Receiver Module storing in each image trail file a transaction table representing a range of transaction identifiers for transactions potentially pending in the primary system at the time that the first audit record in the image trail file was generated by the primary system;

at least one Updater Module that sequentially applies to a backup database the database updates indicated by the audit update records, in the order the audit update records are stored in the image trails; and a file purge procedure for purging image trail files no longer needed, the file purge procedure including instructions for:

identifying an oldest transaction table from among a set of transaction tables, each of which comprises the transaction table in the last image trail file accessed for each of the image trails;

accessing an image trail file for one of the image trails;

comparing a first set of newest transaction identifiers in the transaction table in the accessed image trail file with a second set of oldest transaction identifiers in the identified oldest transaction table, and conditionally purging the accessed image trail file when all of the transaction identifiers in the first set are older than corresponding transaction identifiers in the second set.

12. A backup computer system for replicating database updates performed on a primary system, comprising:

a backup database;

a Receiver Module that receives and stores in one or more image trails a stream of audit records received from the primary system, the audit records including audit update records indicating database updates generated by transactions executing on the primary system, transaction state records and time interval control records, at least a subset of the transaction state records indicating a commit/abort outcome for a specified transaction;

each audit update record and transaction state record including a transaction identifier that identifies a corresponding transaction on the primary system;

the Receiver Module storing the audit update records in one or more image trails;

the Receiver Module includes instructions for:

inspecting the received transaction state records in a predefined chronological order and generating a current transaction table representing a range of transaction identifiers for transactions for which there is at least one transaction state record between successive ones of the time interval control records in the stream of audit records;

saving the current transaction table as a previous transaction table and generating a new current transaction table whenever a time interval control record is received;

storing each of the image trails as a sequence of image trail files, including generating a new image trail file each time a previous image trail file reaches a predefined state, and storing in each new image trail file a copy of the previous transaction table at the time that the new image trail file is generated;

at least one Updater Module that sequentially applies to a backup database the database updates indicated by the audit update records, in the order the audit update records are stored in the image trails; and a file purge procedure for purging image trail files no longer needed, the file purge procedure including instructions for:

identifying an oldest transaction table copy from among a set of transaction table copies, each of which comprises the transaction table copy in the last image trail file accessed for each of the image trails;

accessing an image trail file for one of the image trails;

comparing a first set of newest transaction identifiers in the transaction table copy in the accessed image trail file with a second set of oldest transaction identifiers in the identified oldest transaction table copy, and conditionally purging the accessed image trail file when all of the transaction identifiers in the first set are older than corresponding transaction identifiers in the second set.

13. The backup computer system of claim 12, wherein the file purge procedure includes instructions for:

storing in a global transaction table information including the second set of oldest transaction identifiers in the identified oldest transaction table copy;

for each image trail for which there are more than a predefined (RetainCount) number of image trail files that have not been purged, performing the steps of accessing an image trail file, comparing the first and second sets of transaction identifiers, and conditionally purging the accessed image trail file.

14. The backup computer system of claim 13, wherein the file purge procedure includes instructions for:

for each image trail for which there are more than a predefined (RetainCount) number of image trail files that have not been purged, accessing the image trail files for the image trail in chronological order, excluding the RetainCount most recent image trail files;

for each accessed image trail file comparing the first and second sets of transaction identifiers; and conditionally purging the accessed image trail file when all of the transaction identifiers in the first set are older than corresponding transaction identifiers in the second set.

15. The backup computer system of claim 14, wherein the file purge procedure includes instructions for:

for each image trail for which there are more than a predefined (RetainCount) number of image trail files that have not been purged, accessing the image trail files for the image trail in chronological order, excluding the RetainCount most recent image trail files;

for each accessed image trail file comparing the first and second sets of transaction identifiers;

conditionally purging the accessed image trail file when all of the transaction identifiers in the first set are older than corresponding transaction identifiers in the second set; and stopping the accessing of the image trail files for the image trail when any of the transaction identifiers in the first set are not older than corresponding transaction identifiers in the second set.

* * * * *